United States Patent
Potamias et al.

(10) Patent No.: US 11,068,930 B2
(45) Date of Patent: *Jul. 20, 2021

(54) REIMPRESSION PROMOTION SYSTEM

(71) Applicant: Groupon, Inc., Chicago, IL (US)

(72) Inventors: Michalis Potamias, San Francisco, CA (US); Amit Aggarwal, Sunnyvale, CA (US); Xiaolei Li, Sunnyvale, CA (US); David Thacker, Burlingame, CA (US); Kevin Chang, Mountain View, CA (US)

(73) Assignee: GROUPON, INC., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/545,412

(22) Filed: Aug. 20, 2019

(65) Prior Publication Data

US 2020/0051119 A1     Feb. 13, 2020

Related U.S. Application Data

(63) Continuation of application No. 13/838,874, filed on Mar. 15, 2013, now Pat. No. 10,430,824.

(60) Provisional application No. 61/675,769, filed on Jul. 25, 2012.

(51) Int. Cl.
    *G06Q 30/02*     (2012.01)

(52) U.S. Cl.
    CPC ................ *G06Q 30/0244* (2013.01)

(58) Field of Classification Search
    USPC ..................................... 705/14.43
    See application file for complete search history.

(56) References Cited

U.S. PATENT DOCUMENTS

| | | | |
|---|---|---|---|
| 2006/0143075 A1* | 6/2006 | Carr | G06Q 30/0202 705/14.35 |
| 2009/0271263 A1 | 10/2009 | Regmi et al. | |
| 2009/0271266 A1 | 10/2009 | Regmi et al. | |
| 2010/0198694 A1* | 8/2010 | Muthukrishnan | G06Q 30/0275 705/14.71 |
| 2010/0250351 A1* | 9/2010 | Gillenson | G06Q 30/0216 705/14.13 |
| 2010/0318407 A1* | 12/2010 | Leff | G06Q 30/0207 705/14.1 |
| 2012/0101889 A1* | 4/2012 | Kurata | G06Q 30/0224 705/14.25 |
| 2012/0166267 A1* | 6/2012 | Beatty | G06Q 30/0219 705/14.21 |

(Continued)

OTHER PUBLICATIONS

Location, Location, Location: An Analysis of Profitability of Position in online Advertising markets, Ashish Agarwal, Kartik Hosanagar, and Michael D. Smith (Year: 2011).*

(Continued)

*Primary Examiner* — Gautam Ubale
(74) *Attorney, Agent, or Firm* — Alston & Bird LLP

(57) ABSTRACT

In a promotion offering system, a promotion offering may be presented to a consumer on more than one occasion. The previous presentation of the promotion to the consumer may affect a subsequent presentation of the same promotion to the same consumer. The present invention provides an apparatus and method for analyzing the effect a previous presentation of a promotion may have on a consumer when the promotion is presented to the consumer at a subsequent time.

21 Claims, 16 Drawing Sheets

(56) References Cited

U.S. PATENT DOCUMENTS

| | | | |
|---|---|---|---|
| 2013/0006773 A1* | 1/2013 | Lutnick | G07F 17/34 705/14.58 |
| 2013/0054369 A1* | 2/2013 | Grigg | G06Q 30/02 705/14.58 |
| 2013/0073381 A1* | 3/2013 | Binkley | G06Q 30/02 705/14.48 |

OTHER PUBLICATIONS

The Impact of Visual Appearance on User Response in Online (Year: 2012).*
A Month in the Life of Groupon (Year: 2011).*
U.S. Appl. No. 13/838,874, filed Mar. 15, 2013, now U.S. Pat. No. 10,430,824, Issued.

* cited by examiner

200C

| | Predicted Performance On Day 0 (e.g. Predicted Conversion Rate) | Actual Performance On Day 1 (e.g. Conversion Rate) | Actual Performance On Day 2 (e.g. Conversion Rate) | Actual Performance On Day 3 (e.g. Conversion Rate) |
|---|---|---|---|---|
| Promotion 1 | $\#_{01}$ | $\#_{11}$ | $\#_{21}$ | $\#_{31}$ |
| 2 | $\#_{02}$ | $\#_{12}$ | $\#_{22}$ | $\#_{32}$ |
| 3 | $\#_{03}$ | $\#_{13}$ | $\#_{23}$ | $\#_{33}$ |
| 4 | $\#_{04}$ | $\#_{14}$ | $\#_{24}$ | $\#_{34}$ |
| . | . | . | . | . |
| . | . | . | . | . |
| . | . | . | . | . |

FIG. 2C

|  | Position within an Electronic Correspondence | | | | |
|---|---|---|---|---|---|
|  | 1 | 2 | 3 | 4 | ... |
| 1 | 0.09 | 0.07 | 0.05 | 0.02 | ... |
| 2 | 0.13 | 0.10 | 0.08 | 0.03 | ... |
| 3 | 0.18 | 0.14 | 0.09 | 0.04 | ... |
| 4 | 0.20 | 0.17 | 0.12 | 0.08 | ... |
| . | . | . | . | . |  |
| . | . | . | . | . |  |
| . | . | . | . | . |  |

(Row labels: Amount of Time Since the Consumer was Presented the Promotion) — 300B

FIG. 3B

|  | | Predicted Performance On Day 0 (e.g. Predicted Conversion Rate) | Actual Performance On Day 1 (e.g. Conversion Rate) | Actual Performance On Day 2 (e.g. Conversion Rate) | Actual Performance On Day 3 (e.g. Conversion Rate) |
|---|---|---|---|---|---|
| Promotion | 1 | $\#_{01}$ | $\#_{11}$ | $\#_{21}$ | $\#_{31}$ |
| | 2 | $\#_{02}$ | $\#_{12}$ | $\#_{22}$ | $\#_{32}$ |
| | 3 | $\#_{03}$ | $\#_{13}$ | $\#_{23}$ | $\#_{33}$ |
| | 4 | $\#_{04}$ | $\#_{14}$ | $\#_{24}$ | $\#_{34}$ |
| | ... | ... | ... | ... | ... |

| Amount of Time Since the Consumer was Presented the Promotion | Position (P1) within an Electronic Correspondence |  |  |  |  |
|---|---|---|---|---|---|
| | | 1 | 2 | 3 | 4 | ... |
| 1 | 0.09 | 0.07 | 0.05 | 0.02 | ... |
| 2 | 0.13 | 0.10 | 0.08 | 0.03 | ... |
| 3 | 0.18 | 0.14 | 0.09 | 0.04 | ... |
| 4 | 0.20 | 0.17 | 0.12 | 0.08 | ... |
| . | . | . | . | . | . |

|  | Predicted Performance On Day 0 (e.g. Predicted Conversion Rate) | Actual Performance On Day 1 (e.g. Conversion Rate) | Actual Performance On Day 2 (e.g. Conversion Rate) | Actual Performance On Day 3 (e.g. Conversion Rate) |
|---|---|---|---|---|
| 1 | $\#_{01}$ | $\#_{11}$ | $\#_{21}$ | $\#_{31}$ |
| 2 | $\#_{02}$ | $\#_{12}$ | $\#_{22}$ | $\#_{32}$ |
| 3 | $\#_{03}$ | $\#_{13}$ | $\#_{23}$ | $\#_{33}$ |
| 4 | $\#_{04}$ | $\#_{14}$ | $\#_{24}$ | $\#_{34}$ |
| . | . | . | . | . |
| . | . | . | . | . |
| . | . | . | . | . |

(Promotion, 400C)

FIG. 4C

REIMPRESSION PROMOTION SYSTEM

REFERENCE TO RELATED APPLICATION

Cross Reference to Related Application

This application is a continuation of U.S. patent application Ser. No. 13/838,874 filed Mar. 15, 2013, which claims the benefit of U.S. Provisional Application No. 61/675,769, filed Jul. 25, 2012, the entirety of which is hereby incorporated by reference herein.

FIELD OF THE INVENTION

The present description relates to offering promotions associated with a product or a service. This description more specifically relates to predicting a consumer's reaction to a presentation of a same, or similar, promotional offering that was previously presented to the consumer.

BACKGROUND

Merchants typically offer promotions to consumers from time to time in order to generate more business. The promotions offered may be in the form of discounts, deals, rewards or the like. Oftentimes, a promotion, or a number of promotions, may be presented to a consumer on more than one occasion. When the same, or similar, promotions are offered to a consumer, it may be difficult to determine how the consumer will react to each subsequent presentation of the same, or similar, promotion.

SUMMARY OF THE INVENTION

A system and method is disclosed for providing a prediction of a consumer's reaction to a presentation of a same, or similar, promotion that was previously presented to the consumer.

According to an aspect of the present invention, a method for determining whether or how to offer a contemplated promotion in an electronic correspondence to a consumer, with an amount of time elapsed between offering a promotion in a previous presentation and offering the contemplated promotion, is provided. The method includes: generating an estimated acceptance by the consumer of the contemplated promotion; determining an effect of offering the promotion on the consumer's acceptance of the contemplated promotion; combining the effect of offering the promotion and the estimated acceptance to generate an adjusted estimated acceptance by the consumer; and using the adjusted estimated acceptance in order to determine whether or how to include the contemplated promotion in the electronic correspondence.

According to another aspect of the present invention, a system for determining whether or how to offer a contemplated promotion in an electronic correspondence to a consumer, with an amount of time elapsed between offering a promotion in a previous presentation and offering the contemplated promotion, is provided. The system includes: at least one memory configured to store a previous presentation data model and a historical data model, and a processor in communication with the at least one memory. The processor is configured to: generate an estimated acceptance by the consumer of the contemplated promotion; determine an effect of offering the promotion on the consumer's acceptance of the contemplated promotion; combine the effect of offering the promotion and the estimated acceptance to generate an adjusted estimated acceptance by the consumer; and use the adjusted estimated acceptance in order to determine whether or how to include the contemplated promotion in the electronic correspondence.

Other systems, methods, and features will be, or will become apparent to one with skill in the art upon examination of the following figures and detailed description. It is intended that all such additional systems, methods, and features included within this description, be within the scope of the disclosure, and be protected by the following claims.

BRIEF DESCRIPTION OF THE DRAWINGS

The present invention may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 2C illustrates a collection of performance data organized in the form of a lookup table, according to the present invention;

FIG. 3B illustrates a collection of correction factors; according to the present invention;

FIG. 3C illustrates a collection of performance data organized in the form of a lookup table, according to the present invention;

FIG. 4B illustrates a collection of correction factors; according to the present invention;

FIG. 4C illustrates a collection of performance data organized in the form of a lookup table, according to the present invention;

DETAILED DESCRIPTION

The present invention as described herein may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

A promotion may include any type of reward, discount, coupon, credit, deal, voucher or the like used toward part (or all) of the purchase of a product or a service. The promotion may be offered as part of a larger promotion program, or the promotion may be offered as a standalone one-time promotion. In an effort to better distinguish and identify the promotion, the promotion may include one or more attributes, such as the merchant offering the promotion (e.g., "XYZ coffee shop"), the location of the promotion, the amount of the promotion (e.g., cost of acquiring or participating in the promotion), the category of the promotion (such as a restaurant promotion, a spa promotion, a travel promotion, a local promotion, etc.), the subcategory of the promotion (such as a sushi restaurant), amount of discount offered by the promotion, or the like. Likewise, an electronic correspondence that transmits the offer of the promotion may have one or more attributes, including without limitation: a type of electronic correspondence (e.g., a promotion included in an email, a webpage, etc.); a position assigned to the promotion within the electronic correspondence (e.g., a first position at the beginning of an email, a first position at the top of a webpage, etc.); the look, theme, appearance, or any other visual characteristics of the electronic correspondence that included the promotion; the time of day the electronic correspondence including the promotion was presented to the consumer; or the like. It should be noted that promotions and deals are recited in this disclosure to be understood as being interchangeable, unless specifically stated otherwise.

Figure 1A:
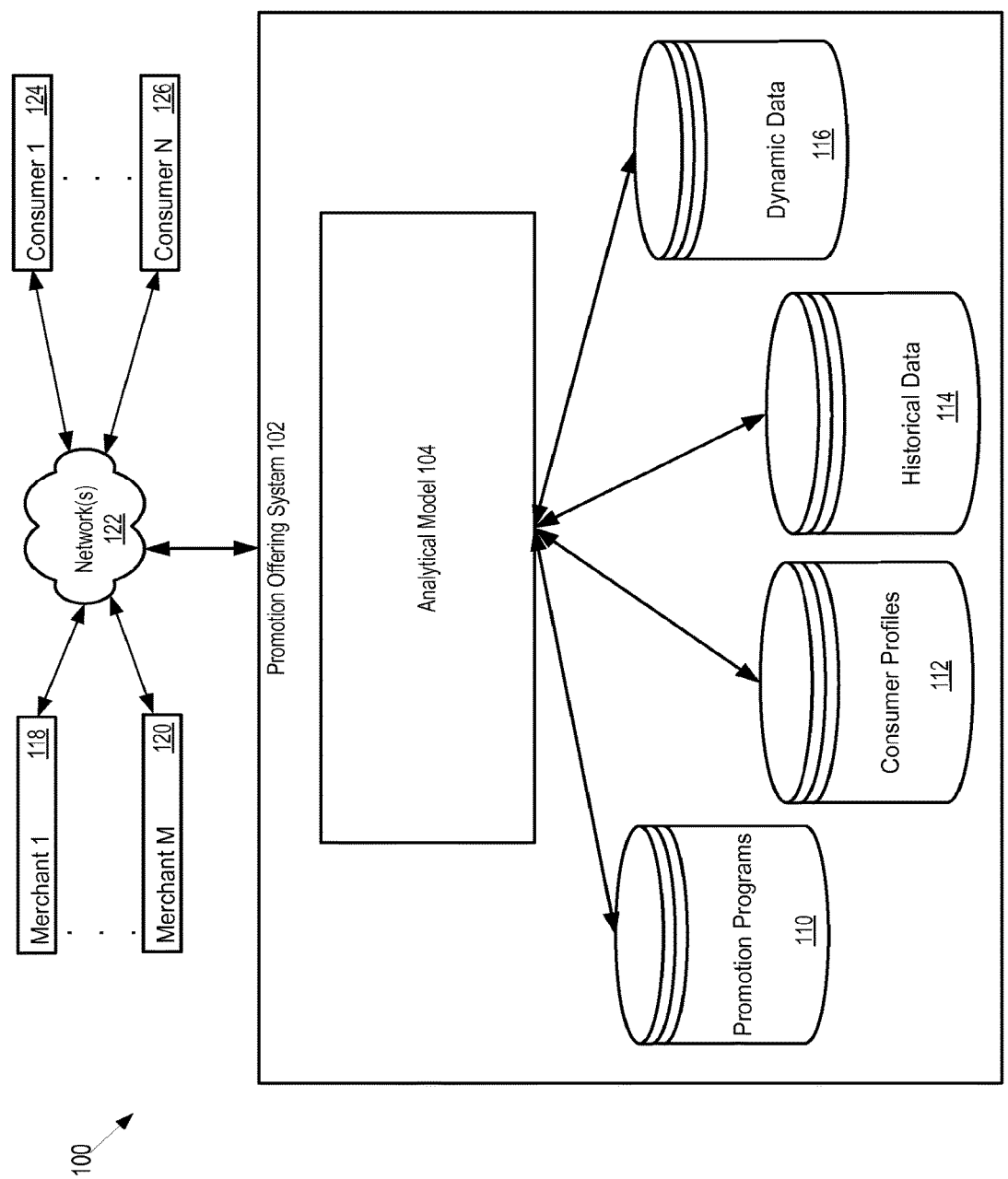
FIG. 1A illustrates a representation of a network and a plurality of devices that interact with the network to achieve an analysis of how previous presentations of a promotion may effect a consumer.

FIG. 1A illustrates an overview for a promotion system 100 configured to offer promotions for promotion programs. The promotion system 100 includes a promotion offering system 102, which communicates via one or more networks 122 with consumers, such as consumer 1 (124) to consumer N (126), and with merchants, such as merchant 1 (118) to merchant M (120). The promotion offering system 102 includes an analytical model 104 that is in communication with databases 110, 112, 114, 116. The analytical model 104 may include one or more components for analyzing the promotions and determining which promotion(s) to send to the consumer. The analytical model 104 is configured to account for previous presentation(s) to the consumer of the promotion (either the same promotion or a similar promotion).

As discussed in more detail below, a promotion offering system 102 as illustrated in FIG. 1A may offer one or more promotions to a consumer at a given time, or at multiple times throughout a set time period. In the case where multiple promotions are offered to the consumer, the promotion offering system 102 may offer groupings of promotions in the form of promotion collections (such as offering, in a single electronic correspondence, multiple promotions selected from a promotion collection). Examples of promotion collections may include, without limitation, local promotions (e.g., promotions that are geographically proximate to the consumer or within a distance threshold to the consumer), short term exclusive promotions, travel themed promotions, specific goods promotions (e.g., electronics, beauty products, sports goods, etc.), service deals, activity deals and holiday themed promotions. In this way, the promotion offering system 102 may determine which promotion(s), or group(s) of promotions, to offer to a consumer. Examples of grouping promotions into promotion collections are disclosed in U.S. Provisional Patent Application No. 61/663,508, and U.S. application Ser. No. 13/838,415, entitled "Promotion Offering System Analyzing Collections of Promotions", both of which are incorporated by reference in their entirety. Going forward, all subsequent mention of a promotion may be interchangeable with a promotion collection.

The one or more promotions that are offered to the consumer may be presented to the consumer in an electronic correspondence. The electronic correspondence may take the form of an email, SMS text message, webpage inbox message, VOIP voice message, real-time webpage content presentation, mobile push notifications or other similar types of electronic correspondences where information is presented to, e.g., "pushed" onto, a consumer. For illustrative purposes only, the following disclosure describes the electronic correspondence being presented to the consumer in the form of an email that is transmitted to the consumer. However, any type of electronic correspondence is contemplated.

One way to present the promotions to the consumer is by sending an email. The promotion offering system 102 may generate the email that includes one or more promotions intended to be viewed by a specific consumer. The email may be tailored for the specific consumer by including promotion(s) that have been selected based on one or more attributes of the consumer.

For instance, one or more attributes of the specific consumer may be used to generate an indication or estimate with respect to whether the specific consumer will accept an offer for the promotion. One way to generate an indication or estimate is to score promotions, with the highest scoring promotion(s), indicating the highest estimate (e.g., probability) of consumer acceptance, for inclusion in the email to the specific consumer. The promotion may be scored according to any one of the methods disclosed in U.S. patent application Ser. No. 13/411,502 and U.S. Provisional Patent Application No. 61/644,352, both of which are incorporated by reference herein in their entirety. Other methods of selecting the promotion(s) for inclusion in the email are contemplated. Further, a diverse mix of promotions may be provided to the consumer, such as discussed in U.S. Provisional Application No. 61/702,431 and U.S. application Ser. No. 13/841,433, entitled "Consumer Cross-Category Deal Diversity", both of which are incorporated by reference herein.

The promotion offering system 102 may determine whether to include a promotion in a contemplated electronic correspondence. A contemplated electronic correspondence may refer to any electronic correspondence the promotion offering system 102 considers sending to a consumer, e.g., via any of the determination or processing performed by the promotion offering system 102. In determining whether to include the promotion in the contemplated electronic correspondence to a specific consumer (e.g., via an email or a webpage), the promotion offering system 102 may consider whether the promotion was previously presented to the specific consumer. The promotion offering system 102 may consider whether the exact same promotion (e.g., identical promotion) or a similar promotion (e.g., a promotion matching configurable similarity criteria, such as one or more matching promotion attributes) was previously presented to the specific consumer. Presenting the promotion to the specific consumer may have an impact on the specific consumer's behavior for a subsequent presentation of the same (or similar) promotion.

The promotion offering system 102 may consider one or more aspects of the previously-sent electronic correspondence and/or one or more aspects of the contemplated electronic correspondence in determining whether to include the promotion in the contemplated electronic correspondence. Alternatively or in addition, the promotion offering system 102 may consider one or more aspects of the previously-sent electronic correspondence and/or one or more aspects of the contemplated electronic correspondence in determining a position within the contemplated electronic correspondence to assign to the promotion.

As discussed in more detail below, aspects of the previously-sent electronic correspondence may include, without limitation, the time of the previously-sent electronic correspondence (e.g., how many days have passed since the email including the promotion was previously sent), the position of the promotion in the previously-sent electronic correspondence, the type of the previously-sent electronic correspondence, etc. Aspects of the contemplated electronic correspondence include, without limitation, the position of the promotion in the contemplated electronic correspondence, the type of the contemplated electronic correspondence, look, colors, or other visual characteristics used within the contemplated electronic correspondence, etc.

As one example, a contemplated email may include a single promotion or multiple promotions. In the case of multiple promotions included in the email, the email may be formatted with set positions for displaying each of the promotions. In addition, each position within the email may be designated with a level of desirability. For example, positions that are closer to the top of the email may be assigned a higher level of desirability than positions that are further down on the email. This is because a consumer that opens up the email has a higher likelihood of viewing promotions that are displayed at the top of the email than promotions that are displayed closer to the bottom of the email.

In order to take advantage of more desirable positions within the email, promotions that have a higher score (e.g., conversion rate or probability of a consumer purchasing the promotion) may be assigned to positions that are designated with higher levels of desirability. For instance, the promotion with the highest score may be assigned the position with the highest level of desirability (e.g., the position at the top of the email). Conversely, the promotion with the lowest score may be assigned the position with the lowest level of desirability.

Although only the email type of electronic correspondence has been discussed, the same positioning principles apply for any of the other types of electronic correspondences mentioned above. For instance, a webpage may also be formatted to include a set of positions that have designated levels of desirability. Promotions that are intended to be displayed on the webpage may be assigned to corresponding positions on the webpage according to a score of each promotion.

The promotion offering system 102 may determine whether to include a promotion in a contemplated electronic correspondence, including through the analytical model 104. In one embodiment illustrated in FIG. 1B, the analytical model 104 is configured to first analyze whether to send the promotion to the consumer independent of whether the promotion was previously sent to the consumer (such as by using an odds model, discussed in FIGS. 5-6), and thereafter modify the analysis based on whether the promotion (or similar promotion) was previously sent to the consumer. More specifically, the analytical model 104 may be segmented into two separate models, a previous presentation data model 130 and a historical data model 132. Generally speaking, the previous presentation data model 130 is configured to generate an effect of previously presenting a same or similar promotion to the consumer, and the historical data model 132 is configured to generate an estimated acceptance of the contemplated promotion independent of whether the same or similar promotion was previously presented.

Figure 1B:
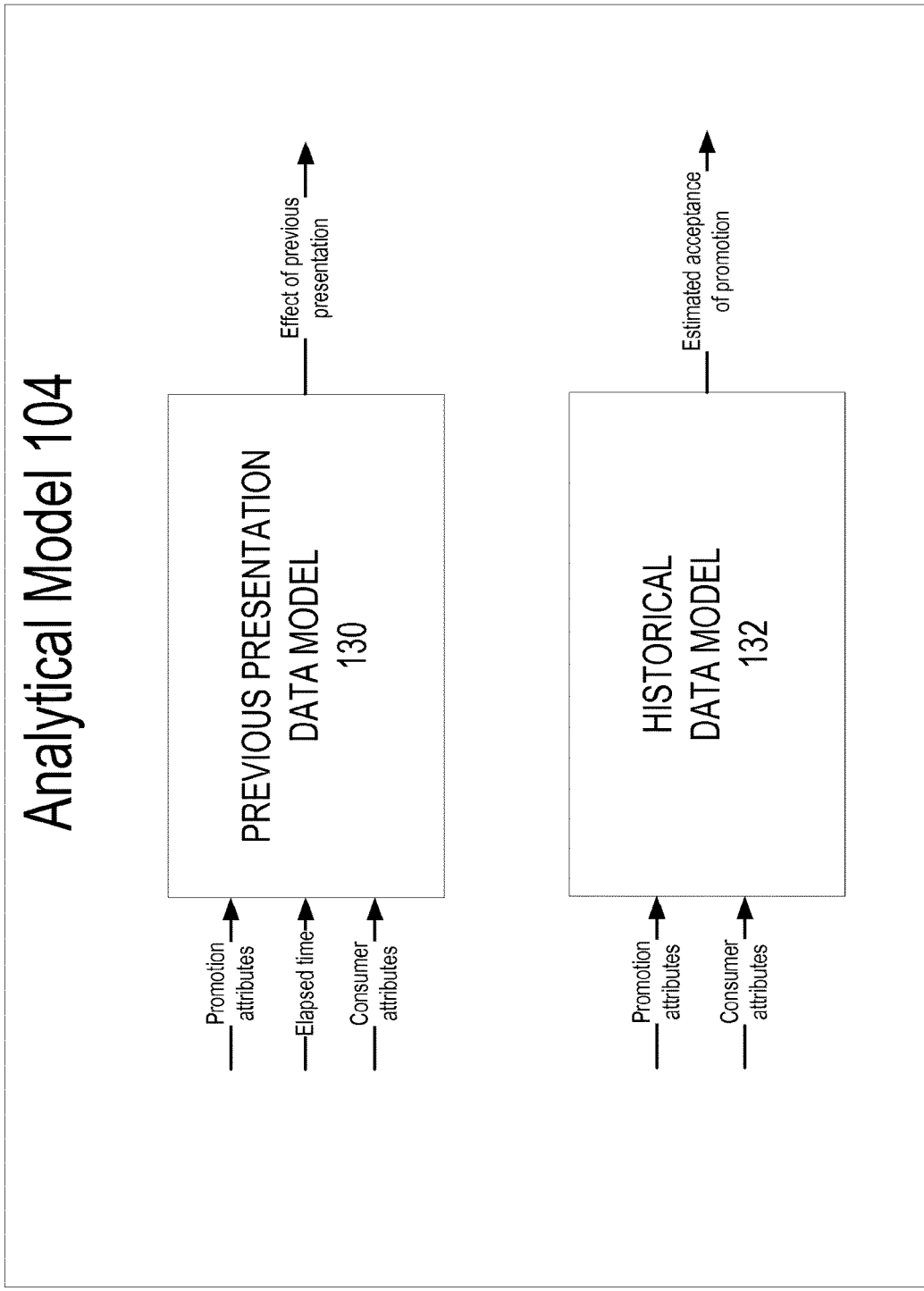
FIG. 1B illustrates a block diagram of one example of the analytical model in FIG. 1A.

The previous presentation data model 130 is configured to receive one or more inputs, as illustrated in FIG. 1B. For example, the previous presentation data model 130 is configured to receive the elapsed time, which is indicative of the amount of time that has elapsed between previously offering the same or similar promotion and offering the contemplated promotion.

Optionally, the previous presentation data model may be organized according to promotions attributes and/or consumer attributes. In this regard, the previous presentation data model 130 may further be configured to receive one or more promotion attributes. As discussed herein, the analytical model 104 may account for previous presentations of promotions in one of several ways. For example, the previous presentation data model 130 may organize and/or store previous performance data for all promotions. Thus, the previous presentation data model 130 need not receive input promotion attributes from an external source since the previous presentation data model 130 is applicable to all promotions. As another example, the previous presentation data model 130 may organize and/or store previous performance data for a subset of all promotions (such as promotions with one or more specific attributes). In this example, the previous presentation data model 130 may receive input promotion attributes in order to determine the applicable portion of the previous presentation data model 130 for the promotion at issue (e.g., if the contemplated promotion has a specific attribute, such as a "restaurant" promotion, and the previous presentation data model 130 organizes the performance data based on attributes, such as performance data for previous presentations of restaurant promotions, the relevant performance data may be accessed based on the promotion attribute input to the previous presentation data model 130).

As still another option, the previous presentation data model 130 may further be configured to receive one or more consumer attributes. As discussed herein, the analytical model 104 may account for previous presentations of promotions in one of several ways. For example, the previous presentation data model 130 may organize previous performance data for all consumers. So that, the previous presentation data model 130 does not need to input consumer attributes since the previous presentation data model 130 is applicable to all consumers. As another example, the previous presentation data model 130 may organize previous performance data for a subset of all consumers (such as consumers with one or more specific attributes). So that, the previous presentation data model 130 may input promotion attributes in order to determine the applicable portion of the previous presentation data model 130 for the specific consumer (e.g., if the consumer has a specific attribute, such as a "male" consumer, and the previous presentation data model 130 organizes the performance data based on attributes, such as performance data for previous presentations to different genders, the relevant performance data may be accessed based on the consumer attribute input to the previous presentation data model 130).

The historical data model 132 may receive one or more input promotion attributes and one or more input consumer attributes in order to generate an estimated acceptance of the promotion. The estimated acceptance of the promotion may be determined independent of whether the same or similar promotion was previously presented.

Figure 1C:
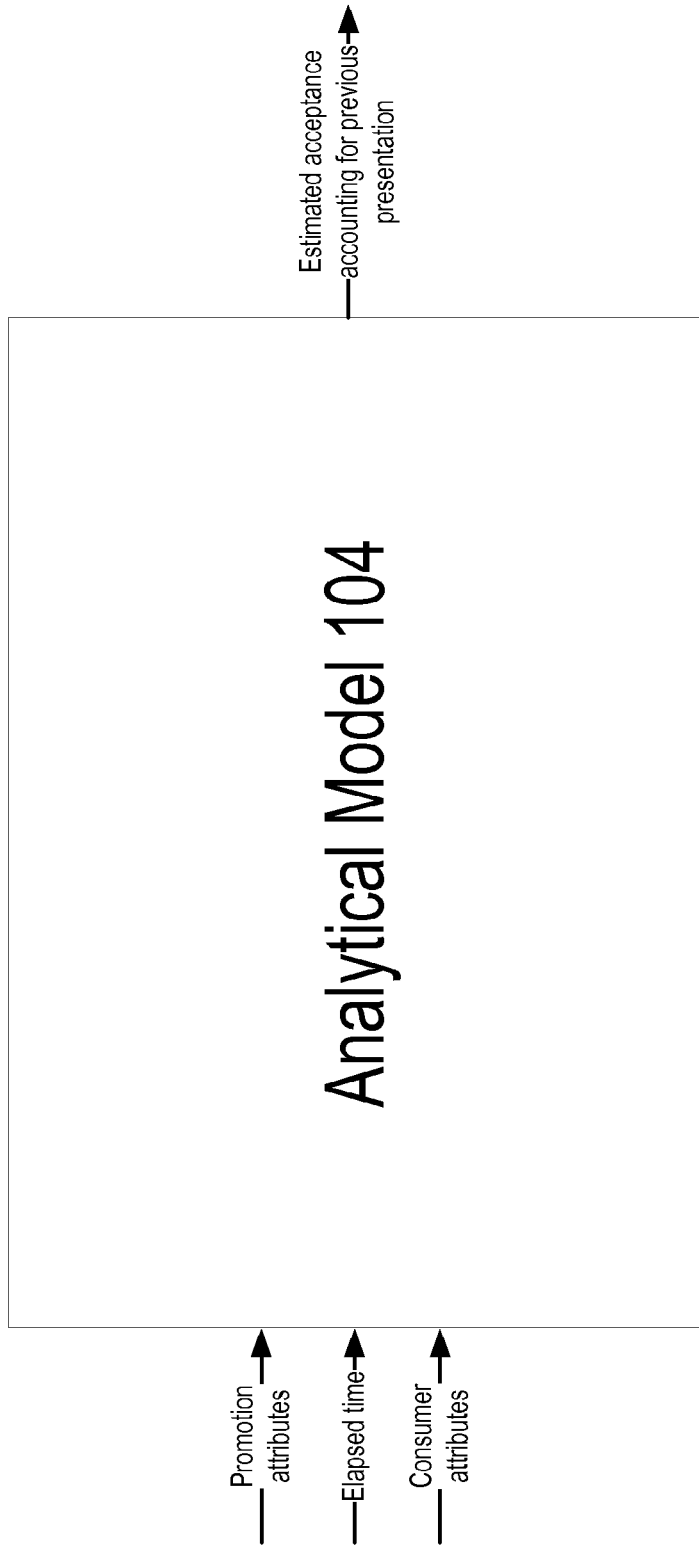
FIG. 1C illustrates a block diagram of another example of the analytical model in FIG. 1A.

In an alternate embodiment illustrated in FIG. 1C, the analytical model 104 is configured to analyze whether to send the promotion to the consumer, simultaneously accounting for factors with respect to factors independent of whether the promotion was previously sent to the consumer and factors based on whether the promotion was previously sent to the consumer. In this embodiment, the analytical model 104 is configured to receive one or more promotion attributes, the elapsed time, and one or more consumer attributes. The analytical model 104 is configured to output the estimated acceptance by the consumer, accounting for the previous presentation of a same or similar promotion to the consumer.

The analytical model 104 may thus determine the probability the consumer will purchase each of the promotions, and select the promotion(s) to include in a contemplated electronic correspondence according to the determined probability. As another example, the analytical model 104 may determine the expectation value of the profit made if the promotion is offered to the consumer, and select the promotion(s) to include in the contemplated electronic correspondence according to the determined expectation values. As still another example, the analytical model 104 may generate a score associated with presenting the promotion (with the score being an indication of a probability that the specific consumer will accept the promotion), and select the promotion(s) according to the determined scores.

The examples of analyses conducted by the analytical model 104 are merely for illustrative purposes. Other types of analyses, disclosed in U.S. application Ser. No. 13/411,502, incorporated by reference herein in its entirety, are contemplated.

The analytical model 104 may include a scoring model that is configured to predict the likelihood that the consumer will accept a promotion that is offered to the consumer independent of whether the consumer was previously presented with the same or similar promotion. The indication of acceptance of the promotion, according to the scoring model, may take one of several forms, such as the conversion rate (the rate by which a consumer accepts a deal that is offered or the number of purchases of the deal divided by the number of times the deal is offered to users) or another type of relevance score. The scoring model may be organized into different categories of consumers correlated with different categories (and subcategories) of promotion types. For example, the analytical model 104 may employ a scoring model that aggregates the historical data from previously-run promotions and/or historical data from the promotion under consideration, organizing attributes of consumers (such as gender and distance from a promotion) with the conversion rates for categories/subcategories of promotions. In particular, the scoring model may be segmented according to one or more user attributes (such as males 0-2 miles from the promotion, males 2-4 miles from the promotion, etc.) and segmented by promotions in different categories/subcategories (such as the category of restaurants, and the subcategories of Italian restaurants, Greek restaurants, etc.). The analytical model 104 aggregates the data from the previous promotions in order to generate the conversion rates for the consumers in the different categories (such as the conversion rate for consumers that are males 2-4 miles from a Greek restaurant deal in Chicago). The examples of the categories of consumers and the categories/subcategories of promotions are merely for illustration purposes only. Other categories are contemplated.

The analytical model 104 may further include one or more components for generating emails including the one or more promotions that have been analyzed, and also assigning a position within the email to each of the included promotions.

The analytical model 104 may likewise include one or more components for analyzing the effect of previous presentation(s) of a promotion to a consumer on a current presentation of the same, or similar, promotion, as described in more detail below. The analytical model 104 may use the effect of previous presentation(s) to determine which promotion(s) to send to the consumer. Alternatively or in addition, the analytical model 104 may use the effect of previous presentations(s) to determine a position within an electronic correspondence to assign each promotion included in the electronic correspondence. Further, the effect may be represented in one of several ways, including a correction factor. As discussed above, the analytical model 104 may generate a probability, an expectation value, or a score independent of the effect of whether the promotion was previously presented to the consumer. The effect of the previous presentation(s), such as the correction factor, may be used to modify the probability, expectation value, or score, thereby potentially modifying whether to include the promotion in the contemplated email, or re-assigning the promotion to a different position in the contemplated email.

In one embodiment, the analytical model 104 may generate the probability, expectation value, or score using an odds model. Output from the odds model may be interpreted as being independent of previous presentation(s) of a promotion. In order to determine the effect of the previous presentation(s), the output of the odds model for previous presentations and the corresponding results of the previous presentations are examined. For example, in generating the effect of presenting the same promotion 7 days ago, the analytical model 104 (or another part of the promotion system 100) may analyze previous presentations of a promotion that had a subsequent presentation of the same promotion 7 days later. The set of previous presentations may include: presentations for all promotions (regardless of category or subcategory); or presentations for less than all promotions (such as presentations for a specific category of deals, a specific subcategory of deals, or another set of promotions that share one or more like attributes). The analytical model 104 may analyze the output of the odds model for the previous presentations (e.g., generate an average of the probability, expectation value, or score derived from the odds model), and analyze the actual results of the subsequent presentation of the promotion at a later time (e.g., generate an average of the actual results of the subsequent presentation 7 days later). The analysis of the output of the odds model and the actual results may be compared, such as by calculating a ratio of the actual results to the output of the odds model, in order to generate a correction factor. The analytical model 104 may apply the correction factor to determine the effect on the consumer during the subsequent presentation (such as using the comparison to generate the effect of a previously presentation of the exact same promotion 7 days earlier). In this way, subsequent uses of the odds model (such as using the odds model to determine whether to include a promotion in a contemplated email) may be modified by the correction factor in order to account for the previous presentation(s) of the promotion. Further description detailing the comparison of the output of the odds model and the actual results is provided throughout this disclosure. Moreover, using the output of the odds model and the actual results to determine the correction factor is merely one way to determine the effect of the previous presentation.

To generate promotion scores, the analytical model 104 may communicate with multiple databases that are part of (or work in conjunction with) the promotion offering system 102, such as a promotion programs database 110, consumer profiles database 112, historical data database 114 and dynamic data database 116. The analytical model 104 may access the databases 110, 112, 114 and 116 in order to obtain specific attribute information for a specific consumer and the various promotions in the promotion system 100. As described throughout this disclosure, various attributes may be associated or assigned to a promotion and a specific consumer in the promotion system 100. The obtained attribute information may then be utilized to generate promotion scores for each promotion with respect to the specific consumer. As discussed above, the promotion scores are one example of an indication of the probability that the specific consumer will accept an offer from a respective promotion.

The promotion programs database 110 is configured to store data detailing various promotions and promotion programs that are available for offer in the promotion offering system 102. In order to input promotion program information into the promotions program database 110, merchants may optionally communicate via the networks 122 with the promotion offering system 102 to input the information detailing the various promotion program offerings.

The consumer profiles database 112 includes profiles for the consumers, consumer 1 (124) to consumer N (126), that are included in the promotion system 100. The attribute information detailed for a consumer stored in the consumer profiles database 112 may include, but is not limited to, name, age, address, occupation, educational background, previously accepted promotion program offerings, previously rejected promotion program offerings, gender and the like. Any one, some or all of the attributes of the specific consumer may be used by the promotion offering system 102 in determining whether to offer a promotion to the specific consumer.

The historical data database 114 includes information detailing the past performance of promotion offerings that have been presented by the promotion offering system 102. The historical data database 114 may include, but is not limited to, rates of acceptances of specific promotion programs, attributes of consumers that accepted or rejected specific promotion programs, and the like.

The dynamic data database 116 includes information detailing the past performance of a promotion program offering that is currently active in the promotion offering system 102. So that, while a promotion program referenced in the dynamic data database 116 is currently active, the data stored in the dynamic data database 116 may include performance data of the active promotion program from a previous time period. For example, promotions from a promotion program may be offered for a period of 1 week. Consumer reaction (e.g., clicking on a link to the promotion in an email, purchase of the promotion, etc.) to offers for the promotions transmitted on the first day may be stored in the dynamic data database 116.

Although FIG. 1A has been illustrated to show separate databases 110, 112, 114 and 116, FIG. 1A has been illustrated for demonstrative purposes only, and it is contemplated to have the databases 110, 112, 114 and 116 arranged in any combination of one or more memories/storage units.

Figure 2A:
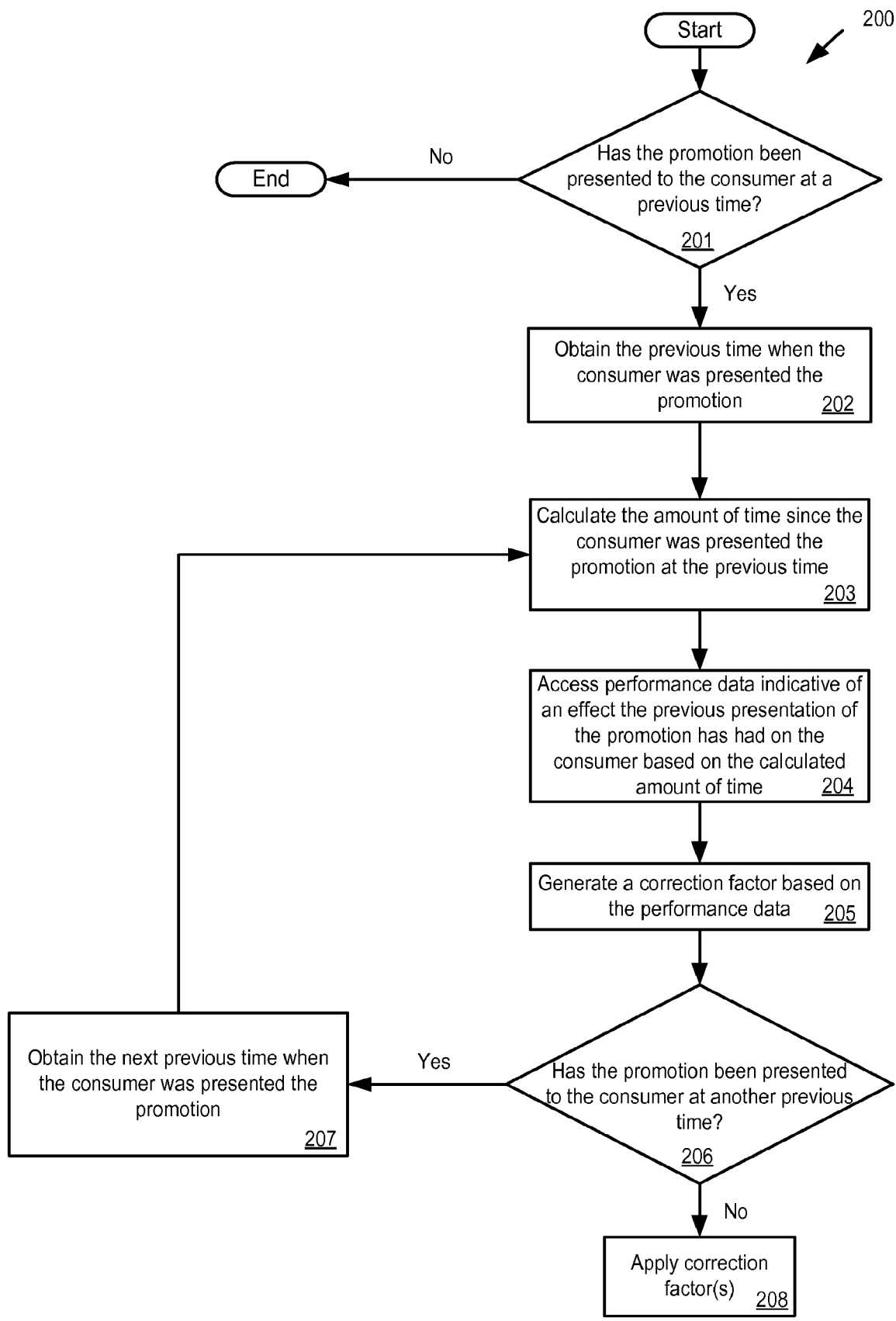
FIG. 2A illustrates a flow chart describing an overview of a process for analyzing an effect of a previous presentation of a promotion to a consumer, according to the present invention.

FIG. 2A illustrates a flow chart 200 describing an overview of a process for analyzing how one or more previous presentations of a promotion to a consumer may affect the behavior of the consumer for a subsequent presentation of the same promotion. For exemplary purposes, a contemplated promotion is described as being transmitted to a contemplated consumer in a contemplated email. The promotion offering system 102 or analytical model 104 may implement the process described in flow chart 200 in hardware, software, firmware, or any combination thereof.

In flow chart 200, the analysis for effect of previous presentation(s) is made by referencing a single attribute describing an amount of time since the contemplated consumer has previously been presented with the contemplated promotion. Further description is provided below.

At 201, it is determined whether the promotion being analyzed for the contemplated email has been previously presented to the consumer. If the contemplated promotion has not been previously presented to the consumer, then the analysis ends and a correction factor is not accessed.

However, if the determination at 201 finds that the contemplated promotion was previously presented to the consumer, then at 202 the previous time at which the consumer was previously presented the contemplated promotion is obtained. The previous time may be referenced as a particular date, time of day (e.g. morning, afternoon or night) or other similar measure of a time.

Alternatively or in addition, in some embodiments instead of determining whether the same contemplated promotion was previously presented to the consumer, at 201 the analytical model 104 may determine whether a promotion that is similar to the contemplated promotion was previously presented to the consumer. A promotion may be considered to be similar to the contemplated promotion if, for example, the promotion shares one or more attributes with the contemplated promotion (e.g., the promotion and the contemplated promotion both are for subcategory Chinese restaurants). Any configurable similarity criteria are contemplated. In these embodiments, performance data may be indicative of an effect of re-presenting a promotion that shares one or more attributes with a previously-presented promotion. A degree of similarity may correspond to a number of attributes shared between the contemplated promotion and the previously presented promotions. In some implementations, the analytical model 104 may give one or more particular attributes greater or lesser weight when determining the degree of similarity. As described above, the process illustrated by flow chart 200 may be expanded to include a determination of whether previous promotions that match or surpass a set degree of similarity as the contemplated promotion were previously presented to the consumer.

After the previous time information is obtained at 202, at 203 an amount of time since the consumer was presented the contemplated promotion at the previous time is calculated. The amount of time may be a difference between the current time for presenting the contemplated email and the obtained previous time. The amount of time may be measured according to a number of hours, days, weeks, months or other similar units of time. For exemplary purposes, the amount of time may be two days such that two days have passed since the contemplated promotion has been presented to the consumer.

In some embodiments, after 203, it may be determined whether the amount of time is greater than a predetermined amount, such as a configurable elapsed time threshold. If the amount of time is greater than the predetermined amount, then the analysis ends and a correction factor is not generated, or a correction factor having no effect may be generated (e.g. the correction factor is a multiplier equal to 1.0). In such embodiments, the promotion offering system 102 or analytical model 104 may be configured such that the predetermined amount of time is great enough that the previous presentation of the contemplated promotion does not affect the consumer for current presentation of the contemplated promotion.

At 204, performance data that is indicative of an effect the previous presentation of the contemplated promotion has had on the consumer may be accessed. The accessed performance data according to flow chart 200 may be based on the amount of time calculated at 203.

In some embodiments, the performance data may be organized as any type of data construct, such as in the form of table 200C illustrated in FIG. 2C. Further, the performance data may be organized based on the type of promotion (e.g., whether the promotion is the same as the contemplated promotion or whether the promotion is similar to the contemplated promotion) and/or based on the type of consumer (e.g., performance data for all consumers, or performance data for a subset of consumers (such as consumers that share one or more consumer attributes).

As discussed above, the analytical model 104 may examine whether the same promotion was previously presented to the consumer. For example, the performance data may be based on the effect of re-presenting the same promotion for all promotions issued by the promotion system 100 over all consumers. For exemplary purposes, the performance data referenced by the process described by flow chart 200 is based on such performance data.

Alternatively, the table (or other data construct) may be configured for performance data for reactions from a subset of consumers that have been presented with the same promotion, such as consumers that have a same attribute (or a same set of attributes). For example, the table may be configured for performance data of the same promotion for consumers 0-2 miles from the promotion, or may be configured for performance data for consumers that are male and age 30-39. Any combination of consumer attributes may be used in order to organize the performance data. So that, for performance data organized based on one or more consumer attributes, the performance data accessed is based on the attributes of the specific consumer for the contemplated promotion. For example, if the consumer is a female age 20-29, the analytical model 104 may access performance data for consumers that were presented with the same promotion that have the attributes of a female age 20-29. As still another example, if the contemplated consumer has the attribute of being a male, then the analytical model 104 may select performance data conversion rates taken over all male consumers. By considering the gender attribute of the contemplated consumer when generating the performance data according to this invention, the performance data may be more relevant to the contemplated consumer. A list of consumer attributes includes, but is not limited to, gender, age or age range, location, past promotion purchases and consumer selected promotion favorites.

Additionally or alternatively, the analytical model 104 may obtain performance data characterizing the effect (as registered by all consumers) of re-presenting a similar promotion (such as for all the promotions in a specific category, a specific sub-category, or the promotion at issue). In such embodiments, promotions that share one or more attributes with the contemplated promotions may be considered to be "similar" promotions, and the performance data may be based on the more concise subset of similar promotions. For instance, if an attribute of the contemplated promotion identifies the contemplated promotion as belonging to a restaurant promotions category, then the performance data may only be selected for promotions that also share the attribute of belonging to the restaurant promotions category. By considering attributes of the contemplated promotion when generating the performance data, the performance data may be more relevant to the contemplated promotion. A list of promotion attributes includes, but is not limited to, promotion sub-category, promotion location, promotion distance from intended consumer and promotion availability.

In still another alternative, the performance data may be based on the effect (as registered by a subset of all consumers, such as consumers that share one or more attributes) of re-presenting a similar promotion. For example, the table may be configured for performance data of a similar promotion for consumers 0-2 miles from the promotion, or may be configured for performance data for consumers that are male and age 30-39. Any combination of consumer attributes may be used in order to organize the performance data.

The performance data accessed at 204 may be represented by the conversion rates included in table 200C. Table 200C maps predicted conversion rates and actual conversion rates for promotions within the promotion offering system 102. For instance, the predicted conversion rates may be based on the predictive odds model, and the actual conversion rates may be based on actual performance data. The historical performance score data may be stored and accessed from the historical data database 114.

In the example shown in FIG. 2C, promotion 1 in table 200C is seen to have a predicted conversion rate of $\#_{01}$ on day 0, where day 0 is the first day promotion 1 is presented to a consumer. The predicted conversion rate $\#_{01}$ may, or may not, have been obtained prior to the presentation of promotion 1 on day 0. The value of the predicted conversion rate $\#_{01}$ may be obtained according to the odds model without any consideration for previous presentations of promotion 1 to consumers. In column 1 (corresponding to day 1) of table 200C, the actual conversion rate for promotion 1 when promotion 1 was presented to the consumer subsequently on day 1 is seen to be $\#_{11}$.

Further, column 2 (corresponding to day 2) in table 200C illustrates the actual conversion rates for promotions that were presented to a consumer two days following a previous presentation of the promotion to the same consumer. For instance, promotion 1 is seen to have an actual conversion rate of $\#_{21}$ when promotion 1 was presented to a consumer two days following a previous presentation of promotion 1 to the same consumer.

Continuing the example discussed above, because the contemplated promotion was determined to have been previously presented to the consumer two days ago (at 203), the performance data from column 2 and their respective predictive performance data in table 200C will be accessed at 204. The performance data from column 2 in table 200C identifies conversion rates for promotions that were presented to a consumer two days after a previous presentation of the promotion to the same consumer.

From the performance data accessed at 204, a correction factor (CF) may be generated at 205. For instance, based on the actual conversion rate data referenced from column 2 of table 200C, the correction factor for the contemplated promotion generated may be (0.13). The correction factor (0.13) for the contemplated promotion indicates that the actual conversion rate for all promotions that are presented to a consumer two days following a previous presentation to the same consumer is thirteen percent (0.13) of the corresponding predicted conversion rate. In terms of the performance scores provided in table 200C, the correction factor (0.13) for the contemplated promotion may be calculated as the ratio of the average of actual conversion rates found in column 2 versus the average of the respective predicted conversion rates in column 0.

Figure 2B:
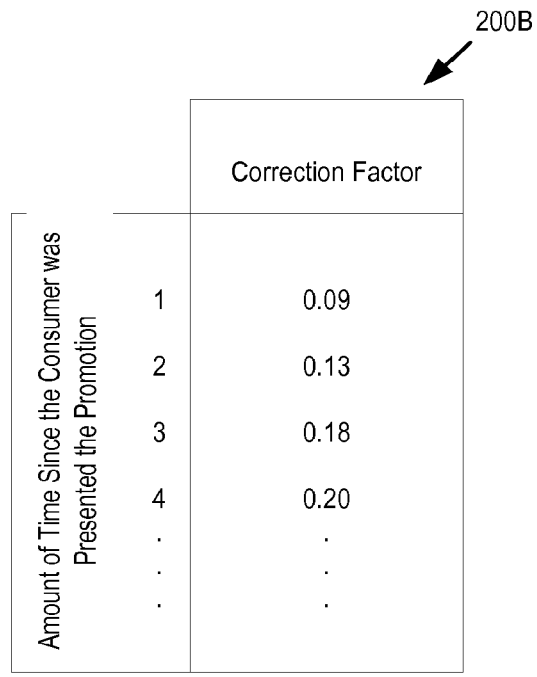
FIG. 2B illustrates a collection of correction factors; according to the present invention.

Correction factors for various contemplated promotions may be organized in any way, for example the lookup table 200B illustrated in FIG. 2B. The lookup table 200B includes a list of effects on performance scores if the promotion is re-presented to a same consumer through correction factors. The correction factor is just one solution for accounting for the effect a previous presentation of a promotion may have on a same consumer. Other solutions are contemplated. However for exemplary purposes, lookup table 200B is seen to include correction factor values that take into account the various lengths of time between presentations of a promotion to a same consumer.

The first entry correction factor (0.09) in lookup table 200B is an indication that the actual conversion rate for all promotions that are presented to a same consumer one day later is nine percent (0.09) of the corresponding predicted conversion rate.

As mentioned above, the second entry correction factor (0.13) in lookup table 200B is an indication that the actual conversion rate for all promotions that are presented to a same consumer two days later is thirteen percent (0.13) of the corresponding predicted conversion rate.

Though FIG. 2A illustrates at 204 and 205 that the performance data is accessed and the correction factor is generated, respectively, the correction data may be generated previously and stored in a lookup table 200B. So that, 204 and 205 may be replaced by a single step of accessing lookup table 200B using the calculated amount of time from 203 to determine the correction factor.

At 206, a determination is made as to whether the contemplated promotion has been presented to the consumer at another previous time. If it is determined that the contemplated promotion was offered to the consumer at another previous time, this next previous time is obtained at 207. Following 207, the process from 203-206 is repeated.

When it is determined at 206 that there are no remaining previous times at which the contemplated promotion was presented to the consumer, the process moves to 208. At 208, all of the generated correction factors are applied to a historical conversion rate for the contemplated promotion. For exemplary purposes, the historical conversion rate for the contemplated promotion may be considered to be twenty percent (0.20). In accordance to this example, the generated correction factor (0.13) is applied to the historical conversion rate of the contemplated promotion (0.20) in the following manner to obtain the adjusted conversion rate for the contemplated promotion:

$$\text{Adjusted conversion rate} = (0.20) \times (0.13) = 0.026$$

The contemplated promotion may have been presented to the consumer at a second previous time. In cases where multiple correction factors are generated corresponding to the number of times the contemplated promotion was previously presented to the consumer, each previous presentation of the contemplated promotion may be considered to be an independent event. Subsequently, by considering each previous presentation of the contemplated promotion as an independent event, each corresponding conversion rate may then be treated as originating from an independent event (e.g., multiple correction factors are applied, with each correction factor corresponding to a previous instance of presenting the promotion).

For exemplary purposes, an amount of time that has passed since a second previous time may be assumed to be three days. Referencing lookup table 200B, the correction factor for the case where the contemplated promotion was previously presented to the same consumer three days ago can be seen to be (0.18). The correction factor (0.18) is an indication that the effect of the previous presentation results in eighteen percent (0.18) of the corresponding predicted conversion rate.

Using this correction factor (0.18) and the known historical conversion rate for the contemplated promotion of twenty percent (0.20), both the generated correction factor (0.18) and the previously generated correction factor (0.13) may be applied to obtain the adjusted conversion rate for the contemplated promotion in the following manner:

$$\text{Adjusted conversion rate} = (0.20) \times (0.13) \times (0.18)$$
$$= 0.00468$$

Generally speaking, the adjusted conversion rate for the contemplated promotion may take on the following form:

$$\text{Adjusted conversion rate} = (\text{Historical conversion rate}) \times (CF_1) \times (CF_2) \times \ldots (CF_n)$$

whereby n is the number of times the contemplated promotion has been previously presented to the consumer, and $(CF_n)$ corresponds to the nth conversion rate generated.

The adjusted conversion rate for the contemplated promotion may be compared to conversion rates of other promotions in the promotion system 100, and a determination of whether to include the contemplated promotion in the contemplated email may be made based on this comparison. As another example, the adjusted conversion rate for the contemplated promotion may be compared to the conversion rates of other promotions included in the contemplated email, and a position of the contemplated promotion within the contemplated email may be adjusted based on this comparison.

Figure 3A:
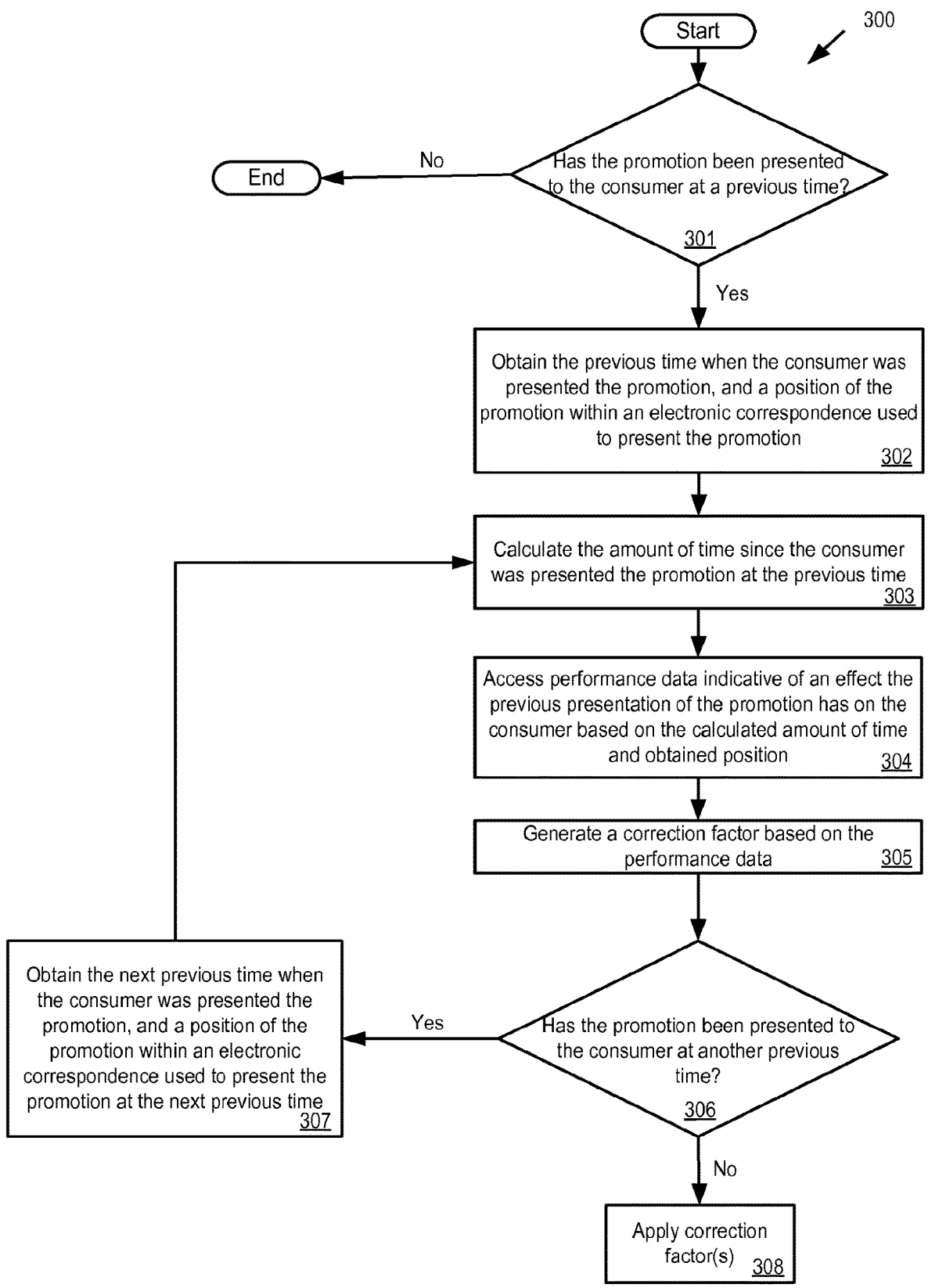
FIG. 3A illustrates a flow chart describing an overview of a process for analyzing an effect of a previous presentation of a promotion to a consumer, according to the present invention.

FIG. 3A illustrates a flow chart 300 describing an overview of a process for analyzing how one or more previous presentations of a promotion to a consumer will affect the behavior of the consumer for a subsequent presentation of the same promotion. For exemplary purposes, a contemplated promotion will be described as being transmitted to a contemplated consumer in a contemplated email. The promotion offering system 102 or analytical model 104 may implement any portion of the process described in flow chart 300 in hardware, software, firmware, or any combination thereof.

In flow chart 300, the analysis references two attributes. The first attribute describes an amount of time since the consumer has previously been presented with the contemplated promotion. The second attribute describes a position within a previous email that the contemplated promotion was assigned to when the contemplated promotion was previously presented to the consumer.

At 301, it is determined whether the contemplated promotion currently being analyzed for the contemplated email has been previously presented to the consumer at a previous time. If the contemplated promotion has not been previously presented to the consumer, then the analysis ends and a correction factor is not accessed.

However, if the determination at 301 finds that the contemplated promotion was previously presented to the consumer, then at 302 the previous time at which the consumer was previously presented the contemplated promotion in an email is obtained. The previous time may be referenced as a particular date, time of day (e.g. morning, afternoon or night) or other similar measure of a time. In addition to obtaining the previous time information at 302, information identifying a position of the contemplated promotion within the previous email presentation to the consumer is obtained. For exemplary purposes, the position at which the contemplated promotion was assigned within a previous email to the consumer may be position two.

Alternatively or in addition, in some embodiments instead of determining whether the same contemplated promotion was previously presented to the consumer, at 301 the analytical model 104 may determine whether a promotion that is similar to the contemplated promotion was previously presented to the consumer. A promotion may be considered to be similar to the contemplated promotion if the promotion shares one or more attributes with the contemplated promotion. In these embodiments, performance data, as will be described in further detail below, may be indicative of an effect of re-presenting a promotion that shares one or more attributes of a previously-presented promotion. A degree of similarity may correspond to a number of attributes shared between the contemplated promotion and the other promotions, as discussed above. In this way, the process illustrated by flow chart 300 may be expanded to include a determination whether other promotions that match or surpass a set degree of similarity as the contemplated promotion, were previously presented to the consumer at a previous time.

After the previous time and position information are obtained at 302, at 303 an amount of time since the consumer was presented the contemplated promotion at the previous time is calculated. The amount of time may be a difference between the current time for presenting the contemplated email and the obtained previous time. The amount of time may be measured according to a number of hours, days, weeks, months or other similar units of time. For exemplary purposes, the amount of time may be two days such that two days have passed since the contemplated promotion has been presented to the consumer.

In some embodiments, after 303, it may be determined whether the amount of time is greater than a predetermined amount, as described above. If the amount of time is greater than the predetermined amount, then the analysis ends and a correction factor is not generated, or a correction factor having no effect may be generated (e.g. the correction factor is a multiplier equal to 1.0). In such embodiments, the promotion offering system 102 is configured such that the predetermined amount of time is great enough that the previous presentation of the contemplated promotion does not affect the consumer for current presentation of the contemplated promotion.

At 304, performance data that is indicative of an effect the previous presentation of the contemplated promotion has had on the consumer may be accessed. The accessed performance data according to flow chart 300 may be based on the amount of time calculated at 303 and the position information obtained at 302.

In some embodiments, the performance data may be organized as any type of data construct, such as in the form of table 300C illustrated in FIG. 3C. As discussed above, the analytical model 104 may examine whether the exact promotion was previously presented to the consumer. For example, the performance data may be based on the effect of re-presenting the same promotion in a same position within an email for any promotions issued by the promotion system 100 over all consumers. For exemplary purposes, the performance data referenced by the process described by flow chart 300 is based on such performance data. However, the performance data may be adjusted in any combination of the ways described with reference to flow chart 200 above.

The performance data accessed at 304 may be represented by the conversion rates included in table 300C. Table 300C maps predicted conversion rates and actual conversion rates for promotions within the promotion offering system 102 taking into consideration two attributes. The first attribute is the amount of time since the consumer was presented the contemplated promotion. And the second attribute is the position in which the contemplated promotion was assigned in the previous presentation. Also, the predicted conversion rates may be based on the predictive odds model, and the actual conversion rates may be based on real historical performance data. The historical performance score data may be stored and accessed from the historical data database 114.

In the example shown in FIG. 3A, promotion 1 in table 300C is seen to have a predicted conversion rate of $\#_{01}$ on day 0, where day 0 is the first day promotion 1 is presented to a consumer. Additionally, the conversion rate data in table 300C will account for the position in the email in which the contemplated promotion was assigned in the previous electronic correspondence (email). The predicted conversion rate $\#_{01}$ may, or may not, have been obtained prior to the presentation of promotion 1 on day 0. The value of the predicted conversion rate $\#_{01}$ may be obtained according to the odds model without any consideration for previous presentations of promotion 1 to consumers. In column 1 (corresponding to day 1) of table 300C, the actual conversion rate for promotion 1 when promotion 1 was presented to the consumer, in the same position within the email as the corresponding promotion, subsequently on day 1 is seen to be $\#_{11}$.

Further, column 2 (corresponding to day 2) in table 300C illustrates the actual conversion rates for promotions that were presented to a consumer, in the same position within the email as the corresponding promotion, two days following a previous presentation of the promotion to the same consumer. For instance, promotion 1 is seen to have an actual conversion rate of $\#_{21}$ when promotion 1 was presented to a consumer, in the second position within the email, two days following a previous presentation of promotion 1 to the same consumer.

According to the current example, because the contemplated promotion was determined to have been previously presented to the consumer two days ago (at 303) in the second position of the email, the performance data from column 2 and their respective predictive performance data in table 300C will be accessed at 304. The performance data from column 2 in table 300C identifies conversion rates for promotions that were presented to a consumer in position two of an email and two days after a previous presentation of the promotion to the same consumer.

From the performance data accessed at 304, a correction factor (CF) may be generated at 305. For instance, based on the actual conversion rate data referenced from column 2 of table 300C, the correction factor for the contemplated promotion generated may be (0.10). The correction factor (0.10) for the contemplated promotion indicates that the actual conversion rate for all promotions that are presented to a consumer in position two and two days following a previous presentation to the same consumer is ten percent (0.10) of the corresponding predicted conversion rate. In terms of the performance scores provided in table 200C, the correction factor (0.10) for the contemplated promotion may be calculated as the ratio of the average of actual conversion rates found in column 2 versus the average of the respective predicted conversion rates in column 0 (corresponding to day 0).

Correction factors for various contemplated promotions may be organized in any way, for example as the lookup table 300B illustrated in FIG. 3B. The lookup table 300B includes a list of effects on performance scores if the promotion is re-presented. The correction factor is just one solution for accounting for the effect a previous presentation of a promotion may have on a same consumer. Other solutions are also contemplated. However for exemplary purposes, lookup table 300B is seen to include correction factor values that take into account the two attributes mentioned above. For instance, the correction factor (0.10) for the contemplated promotion is seen to be located at (2, 2) in the lookup table 300B. The location (2, 2) identifies that the corresponding correction factor takes into account promotions that were presented to a same consumer two days apart, and promotions that were presented in the second position of an email.

As seen in FIG. 3B, the correction factor located at (1, 1) in the lookup table 300B is seen to have the value (0.09), and is an indication that the actual conversion rate for all promotions that are presented to a same consumer in position one of an email and one day later is nine percent (0.09) of the corresponding predicted conversion rate.

As mentioned above, the correction factor located at (2, 2) in lookup table 300B is seen to have the value (0.10), and is an indication that the actual conversion rate for all promotions that are presented to a same consumer in position two of an email and two days later is ten percent (0.10) of the corresponding predicted conversion rate.

Though FIG. 3A illustrates at 304 and 305 that the performance data is accessed and the correction factor is generated, respectively, the correction data may be generated previously and stored in a lookup table 300B. So that, 304 and 305 may be replaced by a single step of accessing lookup table 300B using the calculated amount of time from 203 to determine the correction factor.

At 306, a determination is made as to whether the contemplated promotion has been presented to the consumer at another previous time. If it is determined that the contemplated promotion was offered to the consumer at another previous time, this next previous time is obtained at 307. Following 307, the process from 303-306 is repeated.

When it is determined at 306 that there are no remaining previous times at which the contemplated promotion was presented to the consumer, the process moves to 308. At 308, all of the generated correction factors may be applied to a historical conversion rate for the contemplated promotion. For exemplary purposes, the historical conversion rate for the contemplated promotion may be considered to be twenty percent (0.20). In accordance with this example, the generated correction factor (0.10) is applied to the historical conversion rate of the contemplated promotion (0.20) in the following manner to obtain the adjusted conversion rate for the contemplated promotion:

$$\text{Adjusted conversion rate} = (0.20) \times (0.10) = 0.02$$

The contemplated promotion may have been presented to the consumer at a second previous time. In cases where multiple correction factors are generated corresponding to the number of times the contemplated promotion was previous presented to the consumer, each previous presentation of the contemplated promotion may be considered to be an independent event. Subsequently, by considering each previous presentation of the contemplated promotion as an independent event, each corresponding conversion rate may then be treated as originating from an independent event (e.g., multiple correction factors are applied, with each correction factor corresponding to a previous instance of presenting the promotion).

For exemplary purposes, an amount of time that has passed since a second previous time may be assumed to be three days, and a position within the previous email may be assumed to be the third position. Referencing lookup table 300B, the correction factor for the case where the contemplated promotion was previously presented to the same consumer three days ago in position three of an email can be seen to be (0.09). The correction factor (0.09) is an indication that the effect of the previous results in nine percent (0.09) of the corresponding predicted conversion rate.

Using this correction factor (0.09) and the known historical conversion rate for the contemplated promotion of twenty percent (0.20), both the generated correction factor (0.09) and the previously generated correction factor (0.10) may be applied to obtain the adjusted conversion rate for the contemplated promotion in the following manner:

$$\text{Adjusted conversion rate} = (0.20) \times (0.10) \times (0.09) = 0.0018$$

Generally speaking, the adjusted conversion rate for the contemplated promotion may take on the following form:

$$\text{Adjusted conversion rate} = (\text{Historical conversion rate}) \times (CF_1) \times (CF_2) \times \ldots (CF_n)$$

whereby n is the number of times the contemplated promotion has been previously presented to the consumer, and $(CF_n)$ corresponds to the nth conversion rate generated.

The adjusted conversion rate for the contemplated promotion may be compared to conversion rates of other promotions in the promotion system 100, and a determination of whether to include the contemplated promotion in the contemplated email may be made based on this comparison. Alternatively, the adjusted conversion rate for the contemplated promotion may be compared to the conversion rates of other promotions included in the contemplated email, and a position of the contemplated promotion within the contemplated email may be adjusted based on this comparison.

Figure 4A:
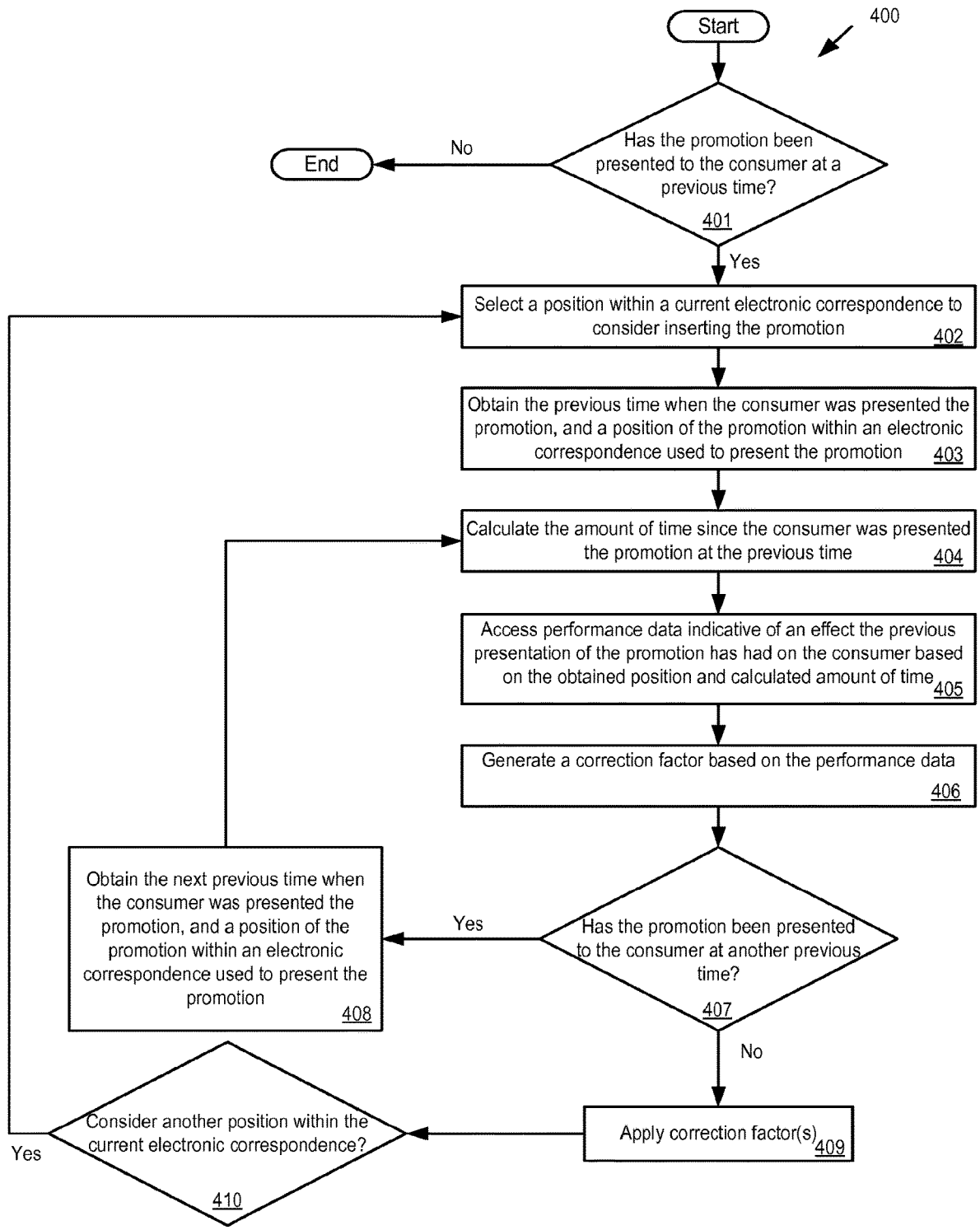
FIG. 4A illustrates a flow chart describing an overview of a process for analyzing an effect of a previous presentation of a promotion to a consumer, according to the present invention.

FIG. 4A illustrates a flow chart 400 describing an overview of a process for analyzing how one or more previous presentations of a promotion to a consumer will affect the behavior of the consumer for a subsequent presentation of the same promotion. For exemplary purposes, a contemplated promotion is described as being transmitted to a contemplated consumer in a contemplated email. The promotion offering system 102 or analytical model 104 may implement any portion of the process described in flow chart 400 in hardware, software, firmware, or any combination thereof.

In flow chart 400, the analysis references three attributes. The first attribute describes an amount of time since the consumer has previously been presented with the contemplated promotion. The second attribute describes a position within a previous email that the contemplated promotion was assigned to when the contemplated promotion was previously presented to the consumer. The third attribute considers the contemplated position of the contemplated promotion in the contemplated email. Further description is provided below.

At 401, it is determined whether the contemplated promotion currently being analyzed for the contemplated email has been previously presented to the consumer at a previous time. If the contemplated promotion has not been previously presented to the consumer, then the analysis ends and a correction factor is not generated nor required.

However, if the determination at 401 finds that the contemplated promotion was previously presented to the consumer, then at 402 a contemplated position for the contemplated promotion within the contemplated email is selected. For exemplary purposes, the system may consider assigning the contemplated promotion to the first position (P1) in the contemplated email.

Alternatively or in addition, in some embodiments instead of determining whether the same contemplated promotion was previously presented to the consumer, at 401 the analytical model 104 may determine whether a promotion that is similar to the contemplated promotion was previously presented to the consumer, as described above. In these embodiments, performance data, as will be described in further detail below, may be indicative of an effect of re-presenting a promotion that shares one or more attributes of a previously-presented promotion. A degree of similarity may correspond to a number of attributes shared between the contemplated promotion and the other promotions. In this way, the processes illustrated by flow chart 400 may be expanded to include a determination whether other promotions that match or surpass a set degree of similarity as the contemplated promotion, were previously presented to the consumer at a previous time.

At 403 the previous time at which the consumer was previously presented the contemplated promotion in an email is obtained. The previous time may be referenced as a particular date, time of day (e.g. morning, afternoon or night) or other similar measure of a time. In addition to obtaining the previous time information at 403, information identifying a position of the contemplated promotion within the previous email presentation to the consumer is obtained. For example, the contemplated promotion was assigned to position two within a previous email to the consumer.

After the previous time and position information are obtained at 403, at 404 an amount of time since the consumer was presented the contemplated promotion at the previous time is calculated. The amount of time may be a difference between the current time for presenting the contemplated email and the obtained previous time. The amount of time may be measured according to a number of hours, days, weeks, months or other similar units of time. For exemplary purposes, the amount of time may be two days such that two days have passed since the contemplated promotion has been presented to the consumer.

In some embodiments, after 404, it may be determined whether the amount of time is greater than a predetermined amount (not illustrated). If the amount of time is greater than the predetermined amount, then the analysis ends and a correction factor is not generated, or a correction factor having no effect may be generated (e.g. the correction factor is a multiplier equal to 1.0). In such embodiments, the promotion offering system 102 is configured such that the predetermined amount of time is great enough that the previous presentation of the contemplated promotion does not affect the consumer for current presentation of the contemplated promotion.

At 405, performance data that is indicative of an effect the previous presentation of the contemplated promotion has had on the consumer may be accessed. In flow chart 400, the accessed performance data may be based on the position of the contemplated email selected at 402, the amount of time calculated at 404 and the position information obtained at 403.

In some embodiments, the performance data may be organized as any type of data construct, such as in the form of table 400C illustrated in FIG. 4C. As discussed above, the analytical model 104 may examine whether the exact promotion was previously presented to the consumer. For example, the performance data may be based on the effect of re-presenting the same promotion in a same position within an email for any promotions issued by the promotion system 100 over all consumers, and also considering a contemplated position within the contemplated email for assigning the contemplated promotion. For exemplary purposes, the performance data referenced by the process described by flow chart 400 is based on such performance data. However, the performance data may be adjusted in any combination of the ways described with reference to flow chart 200 above.

The performance data accessed at 405 may be represented by the conversion rates included in table 400C. Table 400C maps predicted conversion rates and actual conversion rates for promotions within the promotion offering system 102, taking into consideration three attributes. The first attribute is the amount of time since the consumer was presented the contemplated promotion. The second attribute is the position in which the contemplated promotion was assigned in the previous presentation. And the third attribute is a contemplated position within the contemplated email for assigning the contemplated promotion. Also, the predicted conversion rates may be based on the predictive odds model, and the actual conversion rates may be based on real historical performance data. The historical performance score data may be stored and accessed from the historical data database 114.

In the example shown in FIG. 4C, promotion 1 in table 400C is seen to have a predicted conversion rate of $\#_{01}$ on day 0, where day 0 is the first day promotion 1 is presented to a consumer. Additionally, the conversion rate data in table 300C will account for the position in the email in which the contemplated promotion was assigned in the previous electronic correspondence (email), and the contemplated position within the contemplated email for assigning the contemplated promotion. The predicted conversion rate $\#_{01}$ may, or may not, have been obtained prior to the presentation of promotion 1 on day 0. The value of the predicted conversion rate $\#_{01}$ may be obtained according to the odds model without any consideration for previous presentations of promotion 1 to consumers. In column 1 (corresponding to day 1) of table 300C, the actual conversion rate for promotion 1 when promotion 1 was presented to the consumer, in the same position within the email as the corresponding promotion, subsequently on day 1 is seen to be $\#_{11}$.

Further, column 2 (corresponding to day 2) in table 400C illustrates the actual conversion rates for promotions that were presented to a consumer, in the same position within the email as the corresponding promotion, two days following a previous presentation of the promotion to the same consumer. For instance, promotion 1 is seen to have an actual conversion rate of $\#_{21}$ when promotion 1 was presented to a consumer, in the second position within the email, two days following a previous presentation of promotion 1 to the same consumer.

According to the current example, because the contemplated promotion was determined to have been previously presented to the consumer two days ago (at 404) in the second position of the email, the performance data from column 2 and their respective predictive performance data in table 400C will be accessed at 405. The performance data from column 2 in table 400C identifies conversion rates for promotions that were presented to a consumer in position two of an email and two days after a previous presentation of the promotion to the same consumer. The conversion rates included in table 400C also takes into account the added variable of the position within the contemplated email that is being contemplated for assigning the contemplated promotion.

From the performance data accessed at 405, a correction factor (CF) may be generated at 406. For instance, based on the actual conversion rate data referenced from column 2 of table 400C, the correction factor for the contemplated promotion generated may be (0.10). The correction factor (0.10) for the contemplated promotion indicates that the actual conversion rate for all promotions that are presented to a consumer in position two and two days following a previous presentation to the same consumer is ten percent (0.10) of the corresponding predicted conversion rate. In terms of the performance scores provided in table 400C, the correction factor (0.10) for the contemplated promotion may be calculated as the ratio of the average of actual conversion rates found in column 2 versus the average of the respective predicted conversion rates in column 0.

Correction factors for various contemplated promotions may be organized in any way, for example as the lookup table 400B-1 illustrated in FIG. 4B, with and additional lookup tables 400B-2 and 400B-3 being made available as needed. Lookup tables 400B-1, 400B-2 and 400B-3 include a list of effects on performance scores if the promotion is re-presented. The correction factor is just one solution for accounting for the effect a previous presentation of a promotion may have on a same consumer. Other solutions are also contemplated. However for exemplary purposes, lookup tables 400B-1, 400B-2 and 400B-3 are seen to include correction factor values that take into account the three attributes mentioned above. For instance, the correction factor (0.10) for the contemplated promotion is seen to be located at (2, 2) in the lookup table 400B-1. The location (2, 2) identifies that the corresponding correction factor takes into account promotions that were presented to a same consumer two days apart, and promotions that were presented in the second position of an email. The correction factor (0.10) located at (2, 2) in the lookup table 400B-1 also takes into account that the contemplated promotion is being contemplated for the first position (P1) within the contemplated email as selected at 402.

Lookup tables 400B-1, 400B-2 and 400B-3 take into consideration the contemplated position for the contemplated promotion within the contemplated email. For instance, lookup table 400B-1 may include the performance data representing historical conversion rates over all promotions given the two attributes mentioned above, with the added consideration of assigning the contemplated promotion in position one (P1) of the contemplated email. Then lookup table 400B-2 may include the performance data representing historical conversion rates over all promotions given the two attributes mentioned above, with the added consideration of assigning the contemplated promotion in position two (P2) of the contemplated email, and so forth.

According to the current example, because the contemplated promotion being analyzed in flow chart 400B was previously presented to the consumer two days ago, and the position of the contemplated promotion was in position two of the previous email, and the contemplated promotion is being considered for the first position within the contemplated email, performance data located at (2, 2) in lookup table 400B-1 will be accessed. This performance data is seen to be (0.10).

Though FIG. 4A illustrates at 405 and 406 that the performance data is accessed and the correction factor is generated, respectively, the correction data may be generated previously and stored in a lookup table 400B. So that, 405 and 406 may be replaced by a single step of accessing lookup table 400B using the calculated amount of time from 404 to determine the correction factor.

At 407, a determination is made as to whether the contemplated promotion has been presented to the consumer at another previous time. If it is determined that the contemplated promotion was offered to the consumer at another previous time, this next previous time is obtained at 408. Following 408, the process from 404-407 is repeated.

When it is determined at 407 that there are no other previous times at which the contemplated promotion was presented to the consumer, the process moves to 409. At 409, all of the generated correction factors are applied to the historical conversion rate for the contemplated promotion. For exemplary purposes, the historical conversion rate for the contemplated promotion may be considered to be twenty percent (0.20). In accordance to this example, the generated correction factor (0.10) is applied to the historical conversion rate of the contemplated promotion (0.20) in the following manner to obtain the adjusted conversion rate for the contemplated promotion:

$$\text{Adjusted conversion rate} = (0.20) \times (0.10) = 0.02$$

The contemplated promotion may have been presented to the consumer at a second previous time. In cases where multiple correction factors are generated corresponding to the number of times the contemplated promotion was previous presented to the consumer, each previous presentation of the contemplated promotion may be considered to be an independent event. Subsequently, by considering each previous presentation of the contemplated promotion as an independent event, each corresponding conversion rate may then be treated as originating from an independent event (e.g., multiple correction factors are applied, with each correction factor corresponding to a previous instance of presenting the promotion).

For exemplary purposes, an amount of time that has passed since a second previous time may be assumed to be three days, and a position within the previous email may be assumed to be the third position. Referencing lookup table 400B, the correction factor for the case where the contemplated promotion was previously presented to the same consumer three days ago in position three of an email, and the contemplated promotion is being contemplated for the first position (P1) within the contemplated email, can be seen to be (0.09). The correction factor (0.09) is an indication that the effect of the previous presentation results in nine percent (0.09) of the corresponding predicted conversion rate.

Using this correction factor (0.09) and the known historical conversion rate for the contemplated promotion of twenty percent (0.20), both the generated correction factor (0.09) and the previously generated correction factor (0.10)

may be applied to obtain the adjusted conversion rate for the contemplated promotion in the following manner:

$$\text{Adjusted conversion rate} = (0.20) \times (0.10) \times (0.09)$$
$$= 0.0018$$

Generally speaking, the adjusted conversion rate for the contemplated promotion may take on the following form:

$$\text{Adjusted conversion rate} = (\text{Historical conversion rate}) \times (CF_1) \times (CF_2) \times \ldots (CF_n)$$

whereby n is the number of times the contemplated promotion has been previously presented to the consumer, and ($CF_n$) corresponds to the nth conversion rate generated.

The adjusted conversion rate for the contemplated promotion may be compared to conversion rates of other promotions in the promotion system 100, and a determination of whether to include the contemplated promotion in the contemplated email may be made based on this comparison. Alternatively, the adjusted conversion rate for the contemplated promotion may be compared to the conversion rates of other promotions included in the contemplated email, and a position of the contemplated promotion within the contemplated email may be adjusted based on this comparison.

After applying all of the correction factors at 409, at 410 a determination is made whether to perform the analysis described by flow chart 400 for another position assignment of the contemplated promotion within the contemplated email. If another position within the contemplated email is to be considered, the process revisits 402. The analysis for the new position assignment of the contemplated promotion may utilize a corresponding lookup table in FIG. 4B that corresponds to the new position assignment. For instance, if an analysis is to be accomplished for assigning the contemplated promotion in the second position within the contemplated email, lookup table 400B-2 may be referenced. If another position within the contemplated email is not to be considered, the process ends.

Figure 5:
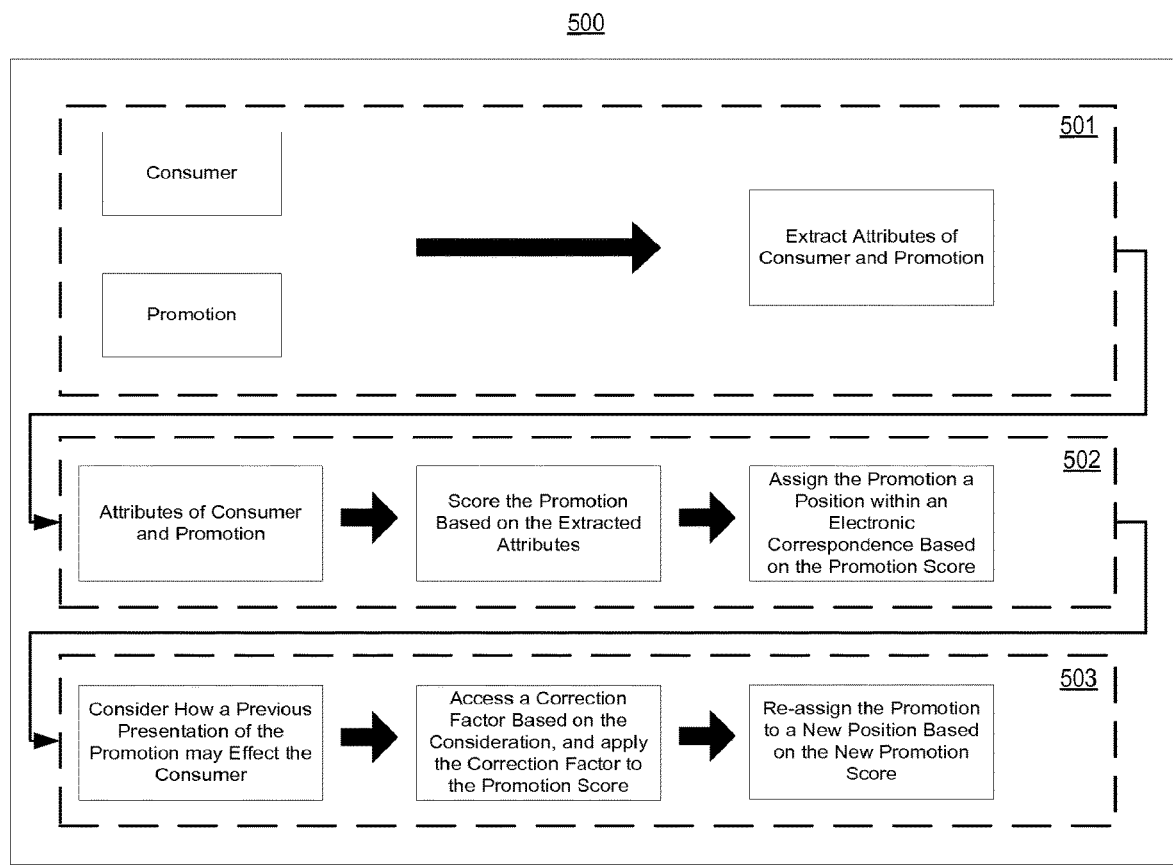
FIG. 5 illustrates a flow diagram describing an overview of a process for extracting attributes of a consumer and a promotion, assigning the promotion to a position within an electronic correspondence based on a score of the promotion, and re-assigning the position of the promotion within the electronic correspondence based on a correction factor, according to the present invention.

FIG. 5 illustrates a flow diagram 500 describing an overview of a process for assigning a contemplated promotion to a position within a contemplated email. The promotion offering system 102 or analytical model 104 may implement any portion of the process described in flow diagram 500 in hardware, software, firmware, or any combination thereof.

At 501, a contemplated promotion and a contemplated consumer for receiving the contemplated promotion are selected. Attributes of the contemplated consumer and the contemplated promotion are extracted. Examples of consumer attributes and promotion attributes, which are not exhaustive, are provided throughout this description.

At 502, the extracted attributes of the contemplated consumer and the contemplated promotion are used in combination with the odds model, discussed above, in order to score the contemplated promotion. The score for the contemplated promotion may be an indication of a probability the contemplated consumer will purchase the contemplated promotion. Once the contemplated promotion is scored, the contemplated promotion may be assigned a position within the contemplated email. The position assigned to the contemplated promotion may be based on an analysis comparing the score of the contemplated promotion against the scores for other promotions included in the contemplated email. The order of assigning positions to promotions included in an email, or other electronic correspondence, is provided above.

At 503, an analysis that considers how a previous presentation of the contemplated promotion may affect the behavior of the contemplated consumer is made. The processes described in flow charts 200, 300 and 400 are encompassed, at least in part, by the analysis described at 503. From this analysis, a correction factor may be accessed. The correction factor may then be applied to the score of the contemplated promotion obtained prior at 502. After the correction factor is applied to the score of the contemplated promotion, a new promotion score of the contemplated promotion is obtained. Based on this new score, the position of the contemplated promotion may be re-assigned.

Figure 6:
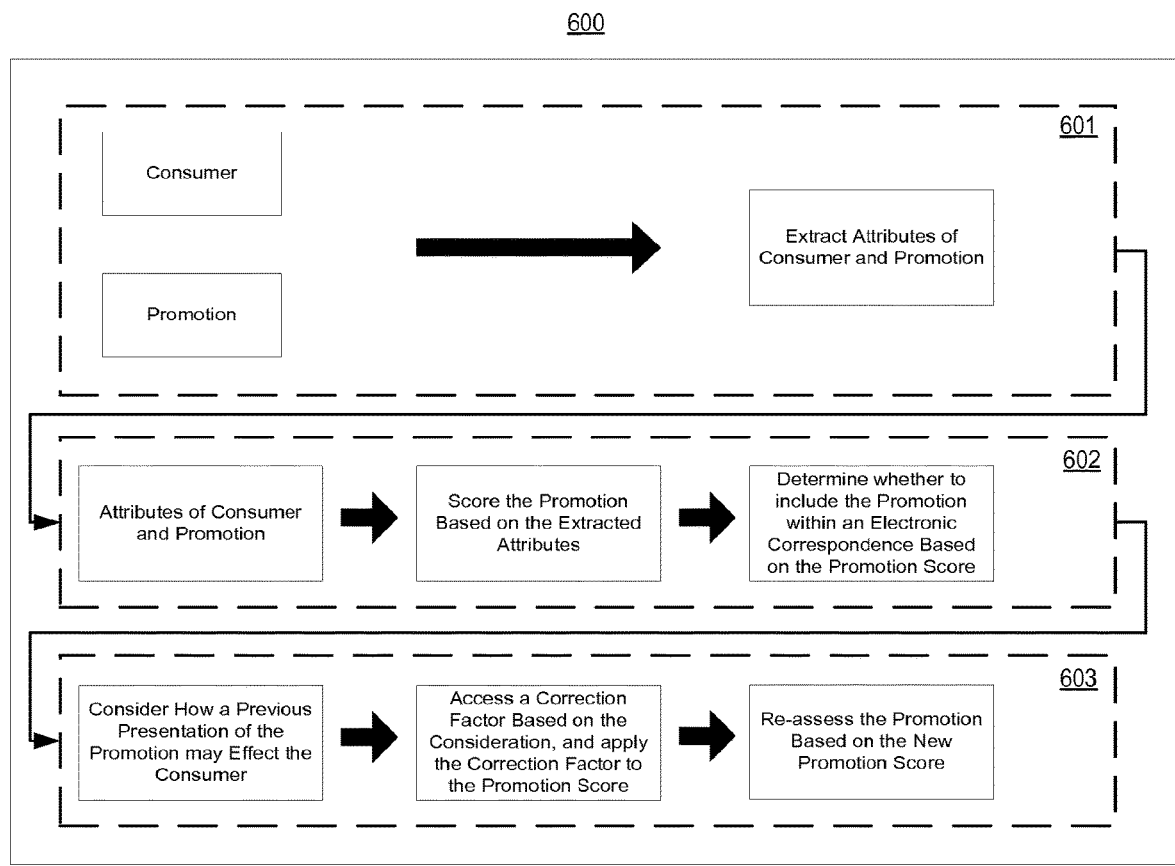
FIG. 6 illustrates a flow diagram describing an overview of a process for extracting attributes of a consumer and a promotion, determining whether to include the promotion in an electronic correspondence based on a score of the promotion, and re-assessing the determination based on a correction factor, according to the present invention.

FIG. 6 illustrates an alternative flow diagram 600 describing an overview of a process for determining whether to include a contemplated promotion within a contemplated email. The promotion offering system 102 or analytical model 104 may implement any portion of the process described in flow diagram 600 in hardware, software, firmware, or any combination thereof.

At 601, a contemplated promotion and a contemplated consumer for receiving the contemplated promotion are selected. Attributes of the contemplated consumer and the contemplated promotion are extracted. Examples of consumer attributes and promotion attributes, which are not exhaustive, are provided throughout this description.

At 602, the extracted attributes of the contemplated consumer and the contemplated promotion are used in combination with the odds model, discussed above, in order to score the contemplated promotion. The score for the contemplated promotion may be an indication of a probability the contemplated consumer will purchase the contemplated promotion. Once the contemplated promotion is scored, a determination may be made as to whether to include the contemplated promotion in the contemplated email. This determination may be made based on an analysis comparing the score of the contemplated promotion against the scores for other promotions included in the contemplated email. If the score indicates that the contemplated promotion is one of the top promotions amongst a set number of promotions that are to be included in the contemplated email, the contemplated promotion may be included in the contemplated email. Alternatively, the contemplated promotion may be included in the contemplated email if the contemplated promotion's score is greater than a set value.

At 603, an analysis that considers how a previous presentation of the contemplated promotion may affect the behavior of the contemplated consumer is made. The processes described in flow charts 200, 300 and 400 are encompassed, at least in part, by the analysis described at 603. From this analysis, a correction factor may be accessed. The correction factor may then be applied to the score of the contemplated promotion obtained prior at 602. After the correction factor is applied to the score of the contemplated promotion, a new promotion score of the contemplated promotion is obtained. Based on this new score, the determination of whether to include the contemplated promotion in the contemplated email may be reassessed. For instance, if the correction factor brings the score of the contemplated promotion down, the contemplated promotion may lose its spot in the contemplated email. Conversely, if the correction factor brings the score of the contemplated promotion up, the contemplated promotion may gain a spot in the contemplated email.

It is further noted that although the description specifically considered the effect of previous presentations of a same, or similar, promotion to a same consumer, the processes and analyses described may also be applied to determine the effect of previous presentations of a same, or similar, collection of promotions to a same consumer. The contemplated email may include one or more promotion collections that may have been scored and analyzed previously, and going forward, as a group. In such cases, the same processes and analyses described above for individual promotions may be applied to the promotion collections.

Although not specifically illustrated in flow charts 200, 300 or 400, an optional analysis may be added following the application of the correction factor(s), or at any time following the generation of the correction factor(s). This optional analysis applies a penalty to the correction factor(s) generated during the processes described in flow charts 200, 300 and 400. The penalty is applied to account for the assumption that consumers become more receptive to purchasing promotions as the time between the presentations of a same promotion increases. In this way, the penalty will decrease as the time between presentations of the same promotion increases. The penalty may be applied to generate a new adjusted conversion rate for the contemplated promotion.

Alternatively or in addition, the penalty may be applied to account for the assumption that consumers become more receptive to purchasing promotion as the time between presentations of a similar promotion increases. In this way, the penalty will decrease as the time between presentations of similar promotions increases. The penalty may be applied to generate a new adjusted conversion rate for the contemplated promotion. A previously presented promotion may be determined to be similar to the contemplated promotion based on the sharing of one or more attribute. A list of promotion attributes may include, but is not limited to, promotion category, promotion sub-category, position within the electronic correspondence assigned to the promotion, location of the promotion, amount of discount offered by the promotion, look of the electronic correspondence, time of day the electronic correspondence including the promotion was presented to the consumer, and so on.

The penalty may take on any number of forms, such as, for example, a penalty multiplier (PM) that is applied either to a correction factor (CF) or an adjusted conversion rate (ACR) that is obtained during the execution of any one of the processes described above in flow charts 200, 300 and 400.

In cases where the penalty multiplier is applied to the correction factor, the penalty multiplier may be applied in the following manner to obtain an adjusted correction factor:

Adjusted correction factor=(CF)×(PM)

In cases where the penalty multiplier is applied to the adjusted conversion rate, the penalty multiplier may be applied in the following manner to obtain a new adjusted conversion rate:

New adjusted conversion rate=(ACR)×(PM)

Figure 7:
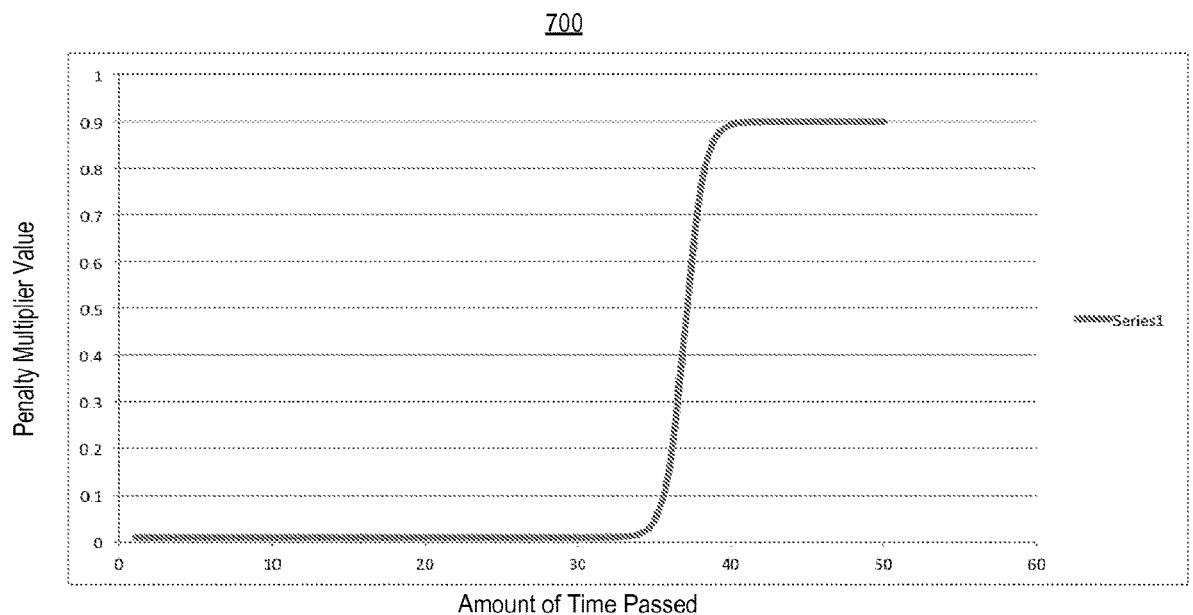
FIG. 7 illustrates a graph depicting a function for plotting a number of penalty multiplier adjustments, according to the present invention.

An example of a function mapping a value of the penalty multiplier is shown in graph 700 illustrated in FIG. 7. The exemplary function is mapped across an amount of time that has passed since a same, or similar, promotion has been presented to a consumer (x-axis) against the penalty multiplier value (y-axis). The amount of time may take on the form of a number of years, months, days, hours, minutes or other like unit of time. For exemplary purposes, the unit of days will be referenced. The graph specifically illustrates the function as series 1, where series 1 may correspond to the penalty multipliers to be applied for the case where the contemplated promotion is being considered for a specific position (e.g. P1) within the contemplated email. A unique function mapping values of a penalty multiplier may be generated for each contemplated position within the contemplated email being considered to assign the contemplated promotion. Alternatively or in addition, a unique function mapping penalty multiplier values may be generated for each set of shared attributes that are considered when determining whether a previous promotion is similar to the contemplated promotion.

The function mapping the penalty multiplier has a number of parameters that may be adjusted based on the historical data obtained for the same, or similar, promotions that are being considered for the penalty analysis. For instance, the minimum penalty multiplier parameter may be adjusted. Also, the maximum penalty multiplier parameter may be adjusted. Also the inflection point of the penalty multiplier function may be adjusted. And a beta parameter that controls the slope of the penalty multiplier function may be adjusted. In the penalty multiplier function illustrated in the graph 700, the minimum penalty multiplier is set to (0.01), the maximum penalty multiplier is set to (0.90), and the inflection point is set to occur at 37 days.

The inflection point may be, as one example, the point where the penalty multiplier becomes: (minimum penalty multiplier)+(maximum penalty multiplier−minimum penalty multiplier)/2

Figure 8:
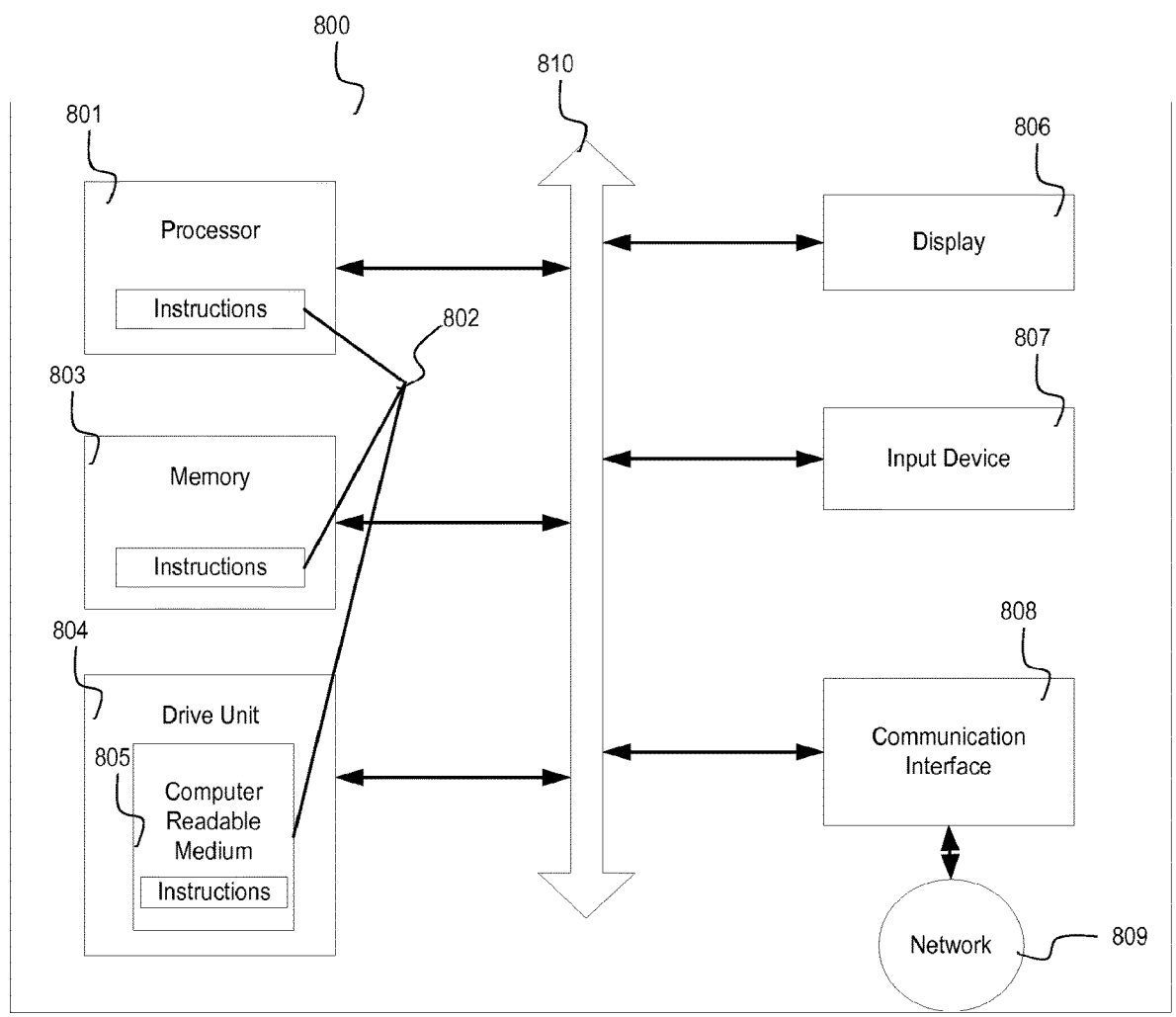
FIG. 8 illustrates a general computer system, programmable to be a specific computer system, which may represent any of the computing devices referenced herein.

FIG. 8 illustrates a general computer system 800, programmable to be a specific computer system 800, which can represent any server, computer or component, such as consumer 1 (124), consumer N (126), merchant 1 (118), merchant M (120), and promotion offering system 102. The computer system 800 may include an ordered listing of a set of instructions 802 that may be executed to cause the computer system 800 to perform any one or more of the methods or computer-based functions disclosed herein. The computer system 800 can operate as a stand-alone device or can be connected, e.g., using the network 122, to other computer systems or peripheral devices.

In a networked deployment, the computer system 800 can operate in the capacity of a server or as a client-user computer in a server-client user network environment, or as a peer computer system in a peer-to-peer (or distributed) network environment. The computer system 800 may also be implemented as or incorporated into various devices, such as a personal computer or a mobile computing device capable of executing a set of instructions 802 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 800 can include a memory 803 on a bus 810 for communicating information. Code operable to cause the computer system to perform any of the acts or operations described herein can be stored in the memory 803. The memory 803 may be a random-access memory, read-only memory, programmable memory, hard disk drive or any other type of volatile or non-volatile memory or storage device.

The computer system 800 can include a processor 801, such as a central processing unit (CPU) and/or a graphics processing unit (GPU). The processor 801 may include one or more general processors, digital signal processors, application specific integrated circuits, field programmable gate arrays, digital circuits, optical circuits, analog circuits, combinations thereof, or other now known or later-developed devices for analyzing and processing data. The processor 801 may implement the set of instructions 802 or other software program, such as manually programmed or computer-generated code for implementing logical functions. The logical function or any system element described can, among other functions, process and convert an analog data source such as an analog electrical, audio, or video signal, or a combination thereof, to a digital data source for audio-visual purposes or other digital processing purposes such as for compatibility for computer processing.

The computer system 800 can also include a disk or optical drive unit 804. The disk drive unit 804 may include a computer-readable medium 805 in which one or more sets of instructions 802, e.g., software, may be embedded. Further, the instructions 802 may perform one or more of the operations as described herein. The instructions 802 may reside completely, or at least partially, within the memory 803 or within the processor 801 during execution by the computer system 800. Accordingly, the databases 110, 112, 114, or 116 may be stored in the memory 803 or the disk unit 804.

The memory 803 and the processor 801 also may include computer-readable media as discussed above. A "computer-readable medium," "computer-readable storage medium," "machine readable medium," "propagated-signal medium," or "signal-bearing medium" may include any device that has, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 800 may include an input device 807, such as a keyboard or mouse, configured for a user to interact with any of the components of system 800. It may further include a display 806, such as a liquid crystal display (LCD), a cathode ray tube (CRT), or any other display suitable for conveying information. The display 806 may act as an interface for the user to see the functioning of the processor 801, or specifically as an interface with the software stored in the memory 803 or the drive unit 804.

The computer system 800 may include a communication interface 808 that enables communications via the communications network 122. The network 122 may include wired networks, wireless networks, or combinations thereof. The communication interface 808 network may enable communications via any number of communication standards, such as 802.11, 802.17, 802.20, WiMax, 802.15.4, cellular telephone standards, or other communication standards, as discussed above. Simply because one of these standards is listed does not mean any one is preferred.

Further, the promotion offering system 102, as depicted in FIG. 1A may comprise one computer system or multiple computer systems. Further, the flow diagrams illustrated in the Figures may use computer readable instructions that are executed by one or more processors in order to implement the functionality disclosed.

The present disclosure contemplates a computer-readable medium that includes instructions or receives and executes instructions responsive to a propagated signal, so that a device connected to a network can communicate voice, video, audio, images or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A method for generating an electronic correspondence, the electronic correspondence comprising a plurality of positions at which to position content for display at a consumer device and determining a final position at which to assign a contemplated promotion within the electronic correspondence from the plurality of positions based at least, in part, on an amount of time elapsed between presenting the contemplated promotion in a previous electronic correspondence, the method comprising:

generating, based in part on a historical data model, an estimated acceptance by a consumer of the contemplated promotion;

determining a contemplated position from among the plurality of positions within the electronic correspondence;

determining, based in part on a previous presentation data model, a correction factor based on (1) an elapsed time, (2) a previous position, and (3) the contemplated position, wherein determining the correction factor comprises:
 determining that the contemplated promotion was previously presented to the consumer at a previous time;
 calculating the elapsed time between previously offering the contemplated promotion and offering the contemplated promotion;
 determining the previous position at which the contemplated promotion was previously presented to the consumer at the previous time;
 determining, based on the elapsed time meeting a configurable elapsed time threshold, the correction factor;

applying the correction factor to the estimated acceptance of the contemplated promotion in order to obtain an adjusted estimated acceptance;

determining a final position from the contemplated position based on the adjusted estimated acceptance, wherein using the adjusted estimated acceptance in order to determine the final position comprises determining whether to include the contemplated promotion in the electronic correspondence, and determining which of the plurality of positions to present the contemplated promotion in the electronic correspondence;

generating the electronic correspondence, the electronic correspondence comprising at least the contemplated promotion located in the final position from among the plurality of positions in the electronic correspondence; and causing transmission of the electronic correspondence, the electronic correspondence configured to display real-time webpage content at a user interface of a user device.

2. The method of claim 1, further comprising: determining whether the contemplated promotion was previously presented to the consumer by determining whether a same promotion was previously presented to the consumer.

3. The method of claim 1, further comprising: determining whether the contemplated promotion was previously presented to the consumer by determining whether at least one attribute of the contemplated promotion matches at least one attribute of the promotion previously presented to the consumer.

4. The method of claim 1, further comprising: accessing the previous presentation data model to consult a first look-up table, the first look-up table identifying a first correction factor value indicative of conversion rates for previous promotions that were presented to a previous consumer after a previous presentation of the previous promotion to the previous consumer at configurable elapsed time thresholds.

5. The method of claim 1, further comprising: accessing the previous presentation data model to consult a second look-up table identifying a second correction factor value indicative of conversion rates for previous promotions that were presented to the consumer at the previous position and at the same elapsed time.

6. The method of claim 1, wherein the previous presentation data model is further configured to input at least one attribute of the contemplated promotion;
 wherein the previous presentation data model is organized based on promotion attributes; and
 wherein the previous presentation data model is configured to output the correction factor indicative of a historical effect of re-offering promotions that share the at least one attribute as the contemplated promotion after the amount of time elapsed.

7. The method of claim 1, wherein the previous presentation data model is further configured to input at least one attribute of the consumer;
 wherein the previous presentation data model is organized based on consumer attributes; and
 wherein the previous presentation data model is configured to output the correction factor indicative of a historical effect of re-offering promotions that share the at least one attribute as the consumer after the amount of time elapsed.

8. A system for generating an electronic correspondence, the electronic correspondence comprising a plurality of positions at which to position content for display at a consumer device and determining a final position at which to assign a contemplated promotion within the electronic correspondence from the plurality of positions based at least, in part, on an amount of time elapsed between presenting the contemplated promotion in a previous electronic correspondence, the system comprising:

at least one memory configured to store a previous presentation data model and a historical data model; and a processor in communication with the at least one memory and configured to:

generate, based in part on a historical data model, an estimated acceptance by a consumer of the contemplated promotion;

determine a contemplated position from among the plurality of positions within the electronic correspondence;

determine, based in part on a previous presentation data model, a correction factor based on (1) an elapsed time, (2) a previous position, and (3) the contemplated position, wherein determining the correction factor comprises:
  determining that the contemplated promotion was previously presented to the consumer at a previous time;
  calculating the elapsed time between previously offering the contemplated promotion and offering the contemplated promotion;
  determining the previous position at which the contemplated promotion was previously presented to the consumer at the previous time;
  determining, based on the elapsed time meeting a configurable elapsed time threshold, the correction factor;

apply the correction factor to the estimated acceptance of the contemplated promotion in order to obtain an adjusted estimated acceptance;

determine a final position from the contemplated position based on the adjusted estimated acceptance, wherein using the adjusted estimated acceptance in order to determine the final position comprises determining whether to include the contemplated promotion in the electronic correspondence, and determining which of the plurality of positions to present the contemplated promotion in the electronic correspondence;

generate the electronic correspondence, the electronic correspondence comprising at least the contemplated promotion located in the final position from among the plurality of positions in the electronic correspondence; and cause transmission of the electronic correspondence, the electronic correspondence configured to display real-time webpage content at a user interface of a user device.

9. The system of claim 8, wherein the processor is further configured to: determine whether the contemplated promotion was previously presented to the consumer by determining whether a same promotion was previously presented to the consumer.

10. The system of claim 8, wherein the processor is further configured to: determine whether the contemplated promotion was previously presented to the consumer by determining whether at least one attribute of the contemplated promotion matches at least one attribute of the promotion previously presented to the consumer.

11. The system of claim 8, wherein the processor is further configured to: accessing the previous presentation data model to consult a first look-up table, the first look-up table identifying a first correction factor value indicative of conversion rates for previous promotions that were presented to a previous consumer after a previous presentation of the previous promotion to the previous consumer at configurable elapsed time thresholds.

12. The system of claim 8, wherein the processor is further configured to: access the previous presentation data model to consult a second look-up table identifying a second correction factor value indicative of conversion rates for previous promotions that were presented to the consumer at the previous position and at the same elapsed time.

13. The system of claim 8, wherein the previous presentation data model is further configured to input at least one attribute of the contemplated promotion;
  wherein the previous presentation data model is organized based on promotion attributes; and
  wherein the previous presentation data model is configured to output the correction factor indicative of a historical effect of re-offering promotions that share the at least one attribute as the contemplated promotion after the amount of time elapsed.

14. The system of claim 8, wherein the previous presentation data model is further configured to input at least one attribute of the consumer;
  wherein the previous presentation data model is organized based on consumer attributes; and
  wherein the previous presentation data model is configured to output the correction factor indicative of a historical effect of re-offering promotions that share the at least one attribute as the consumer after the amount of time elapsed.

15. A computer program product for generating an electronic correspondence, the electronic correspondence comprising a plurality of positions at which to position content for display at a consumer device and determining a final position at which to assign a contemplated promotion within the electronic correspondence from the plurality of positions based at least, in part, on an amount of time elapsed between presenting the contemplated promotion in a previous electronic correspondence, the computer program product comprising at least one non-transitory computer-readable storage medium having computer-executable program code instructions stored therein, the computer-executable program code instructions comprising program code instructions for:

generating, based in part on a historical data model, an estimated acceptance by a consumer of the contemplated promotion;

determining a contemplated position from among the plurality of positions within the electronic correspondence;

determining, based in part on a previous presentation data model, a correction factor based on (1) an elapsed time, (2) a previous position, and (3) the contemplated position, wherein determining the correction factor comprises:
  determining that the contemplated promotion was previously presented to the consumer at a previous time;
  calculating the elapsed time between previously offering the contemplated promotion and offering the contemplated promotion;
  determining the previous position at which the contemplated promotion was previously presented to the consumer at the previous time;
  determining, based on the elapsed time meeting a configurable elapsed time threshold, the correction factor;

applying the correction factor to the estimated acceptance of the contemplated promotion in order to obtain an adjusted estimated acceptance;

determining a final position from the contemplated position based on the adjusted estimated acceptance, wherein using the adjusted estimated acceptance in order to determine the final position comprises determining whether to include the contemplated promotion in the electronic correspondence, and determining which of the plurality of positions to present the contemplated promotion in the electronic correspondence;

generating the electronic correspondence, the electronic correspondence comprising at least the contemplated promotion located in the final position from among the plurality of positions in the electronic correspondence; and causing transmission of the electronic correspondence, the electronic correspondence configured to display real-time webpage content at a user interface of a user device.

16. The computer program product according to claim 15, further comprising: determining whether the contemplated promotion was previously presented to the consumer by determining whether a same promotion was previously presented to the consumer.

17. The computer program product according to claim 15, further comprising: determining whether the contemplated promotion was previously presented to the consumer by determining whether at least one attribute of the contemplated promotion matches at least one attribute of the promotion previously presented to the consumer.

18. The computer program product according to claim 15, further comprising: accessing the previous presentation data model to consult a first look-up table, the first look-up table identifying a first correction factor value indicative of conversion rates for previous promotions that were presented to a previous consumer after a previous presentation of the previous promotion to the previous consumer at configurable elapsed time thresholds.

19. The computer program product according to claim 15, further comprising: accessing the previous presentation data model to consult a second look-up table identifying a second correction factor value indicative of conversion rates for previous promotions that were presented to the consumer at the previous position and at the same elapsed time.

20. The computer program product according to claim 15, wherein the previous presentation data model is further configured to input at least one attribute of the contemplated promotion;

wherein the previous presentation data model is organized based on promotion attributes; and wherein the previous presentation data model is configured to output the correction factor indicative of a historical effect of re-offering promotions that share the at least one attribute as the contemplated promotion after the amount of time elapsed.

21. The computer program product according to claim 15, wherein the previous presentation data model is further configured to input at least one attribute of the consumer;

wherein the previous presentation data model is organized based on consumer attributes; and wherein the previous presentation data model is configured to output the correction factor indicative of a historical effect of re-offering promotions that share the at least one attribute as the consumer after the amount of time elapsed.

* * * * *